US012523514B2

(12) United States Patent
Pankov et al.

(10) Patent No.: US 12,523,514 B2
(45) Date of Patent: Jan. 13, 2026

(54) CAPACITIVE LEVEL SENSOR, SENSITIVE ELEMENT OF THE CAPACITIVE LEVEL SENSOR, ELECTRODE HOUSING FOR THE CAPACITIVE LEVEL SENSOR

(71) Applicant: LIMITED LIABILITY COMPANY "OMNIKOMM TEHNOLOGII", Schelkovo (RU)

(72) Inventors: Boris Valerevich Pankov, Moscow (RU); Aleksandr Borisovich Maksimenko, Moscow (RU); Yury Anatolevich Diakonov, Reutov (RU); Alexandr Grigorievich Krestinov, Zelenograd (RU)

(73) Assignee: Pankov Boris, Alicante (ES)

( * ) Notice: Subject to any disclaimer, the term of this patent is extended or adjusted under 35 U.S.C. 154(b) by 335 days.

(21) Appl. No.: 17/432,032

(22) PCT Filed: Feb. 21, 2019

(86) PCT No.: PCT/RU2019/000110
§ 371 (c)(1),
(2) Date: Aug. 18, 2021

(87) PCT Pub. No.: WO2020/171728
PCT Pub. Date: Aug. 27, 2020

(65) Prior Publication Data
US 2021/0381874 A1 Dec. 9, 2021

(51) Int. Cl.
*G01F 23/263* (2022.01)
(52) U.S. Cl.
CPC .......... *G01F 23/266* (2013.01); *G01F 23/268* (2013.01)

(58) Field of Classification Search
None
See application file for complete search history.

(56) References Cited

U.S. PATENT DOCUMENTS 2,512,757 A 6/1950 Westall
2,918,818 A * 12/1959 Meyer .................. G01F 23/263
73/304 C (Continued)

FOREIGN PATENT DOCUMENTS

CN 2542612 4/2003
CN 2684153 3/2005

(Continued)

OTHER PUBLICATIONS

International Preliminary Report on Patentability for PCT/RU2019/000110.

(Continued)

*Primary Examiner* — John E Breene
*Assistant Examiner* — Alex T Devito
(74) *Attorney, Agent, or Firm* — Chad Peterson

(57) ABSTRACT

The proposed technical solution relates to measuring technology and is intended for measuring levels of measured medium in various branches of industry. The technical problem solved by the claimed invention is the production of a capacitive level sensor which demonstrates high operational reliability and provides highly accurate measurements. The technical result achieved by using the claimed invention consists in overcoming the disadvantages of the prior art, increasing the reliability and manufacturability of the design and thus increasing the accuracy of interface level measurements.

6 Claims, 21 Drawing Sheets

(56) References Cited

U.S. PATENT DOCUMENTS

| | | | | |
|---|---|---|---|---|
| 3,349,301 | A | * | 10/1967 | Bell ............... G01F 23/268 73/304 C |
| 3,797,311 | A | * | 3/1974 | Blanchard ......... G01F 23/265 73/304 C |
| 3,862,571 | A | | 1/1975 | Vogel |
| 3,901,029 | A | | 8/1975 | Kondo |
| 3,901,079 | A | * | 8/1975 | Vogel .............. G01F 23/263 73/304 C |
| 4,056,978 | A | | 11/1977 | Zimmermann |
| 4,879,902 | A | * | 11/1989 | Loniello ............ G05D 9/12 73/304 C |
| 4,908,783 | A | * | 3/1990 | Maier .............. G01F 23/263 73/304 R |
| 5,052,223 | A | * | 10/1991 | Regnault ........... G01F 23/263 73/304 C |
| 5,230,439 | A | | 7/1993 | Klok et al. |
| 6,604,555 | B2 | | 8/2003 | Blatt et al. |
| 9,255,831 | B2 | | 2/2016 | Duan |
| 9,383,245 | B2 | | 7/2016 | Kato |
| 2008/0229819 | A1 | | 9/2008 | Mayleben |

FOREIGN PATENT DOCUMENTS

| | | | |
|---|---|---|---|
| CN | 102007424 | | 4/2011 |
| CN | 203274850 | | 11/2013 |
| CN | 203587175 | | 5/2014 |
| CN | 203881407 | | 10/2014 |
| CN | 206311172 | | 7/2017 |
| CN | 208027180 | | 10/2018 |
| CN | 106225876 | | 5/2023 |
| DE | 20319370 | | 3/2004 |
| DE | 102006030857 | | 1/2007 |
| DE | 202007014056 | | 12/2008 |
| DE | 202007014057 | | 12/2008 |
| DE | 102017203312 | | 9/2017 |
| EA | 1683 | | 6/2001 |
| EP | 470483 | | 9/1995 |
| GB | 2097129 | | 9/1985 |
| GB | 2444552 | * | 6/2008 |
| JP | H05273032 | | 10/1993 |
| JP | 2933853 | | 8/1999 |
| JP | 2000275086 | | 10/2000 |
| JP | 2007178243 | | 7/2007 |
| JP | 4828911 | | 11/2011 |
| KR | 100963187 | | 6/2010 |
| RU | 2037787 | | 6/1995 |
| RU | 2042928 | | 8/1995 |
| RU | 2065393 | | 8/1996 |
| RU | 2104440 | | 2/1998 |
| RU | 2112931 | | 6/1998 |
| RU | 56599 | | 9/2006 |
| RU | 2296955 | | 4/2007 |
| RU | 83481 | | 6/2009 |
| RU | 123942 | | 1/2013 |
| RU | 2569908 | | 12/2015 |
| RU | 2594380 | | 8/2016 |
| RU | 2722862 | | 8/2016 |
| RU | 2602813 | | 11/2016 |
| RU | 180003 | | 5/2018 |
| RU | 183284 | | 9/2018 |
| WO | 2005111552 | | 11/2005 |
| WO | 2006029427 | | 3/2006 |
| WO | 2016203601 | | 12/2016 |
| WO | WO-2016203601 A1 | * | 12/2016 ............ G01F 23/26 |
| WO | 2019016658 | | 1/2019 |

OTHER PUBLICATIONS

International Search Report for PCT/RU2019/000110.
Written Opinion of the International Search Authority for PCT/RU2019/000110.

* cited by examiner measured
medium measured
medium

CAPACITIVE LEVEL SENSOR, SENSITIVE ELEMENT OF THE CAPACITIVE LEVEL SENSOR, ELECTRODE HOUSING FOR THE CAPACITIVE LEVEL SENSOR

FIELD OF THE INVENTION

The present disclosure proposed relates to measuring equipment, is designed to measure medium levels, and may be used in various industries.

BACKGROUND OF THE INVENTION

It is known as a capacitive liquid level sensor described in patent U.S. Pat. No. 3,901,079 published on Aug. 26, 1975, on 12 sheets (D1). The capacitive liquid level sensor known from D1 comprises a housing for the sensor's electronic computing equipment, connected to the housings for the sensor's electrode probes.

The disadvantage of the sensor known from D1 is its low serviceability and high measurement error resulting mainly from the insufficiently efficient and reliable design of the housing for the sensor's electrode probes.

BRIEF SUMMARY OF THE INVENTION

The technical problem to be solved by the claimed invention is to create a capacitive level sensor that features high serviceability and high measurement accuracy, can measure the level of liquid media with different permittivity, and does not require further calibration.

The technical effect to be achieved by using the claimed invention is to eliminate the disadvantages of the prototype, to increase the reliability and manufacturability of the design and, consequently, to increase the accuracy of level measurements, as well as to make it possible to measure the level of liquid media with different permittivity without the need for further calibration of the capacitive sensor.

The technical effect is achieved by providing a capacitive level sensor comprising: a base; a sensitive element; therewith the base comprises at least: first part having a recess with a cover to hermetically house a computing unit, as well as a hole for the computing unit's output cable; second part having holes for expansion sleeves mostly in the center, in the area of the first part, holes for fasteners in the side, vent holes in the lateral side; therewith the sensitive element is an electrode housing, which is a metal section formed by at least two tubes that are connected to each other at least partially along the length of said metal section, which comprises at least one stiffener connecting at least the two adjacent tubes of the section; therewith each tube of the section has a slit aligned axially with the corresponding vent hole in the lateral side and arranged at least partially lengthwise at least in one side adjacent to the measured medium; therewith the electrode housing contains electrodes rigidly fixed in each tube of the section, and these electrodes are metal tubes having the same unit-length capacitance but differing in their length, and the main electrode is mostly as long as the electrode housing, and each compensation electrode is shorter than the main electrode; therewith the sensitive element is connected to the base through holes for fasteners; therewith the main electrode and each compensation electrode are connected to the computing unit by means of metal rods connected to expansion sleeves, which are connected to holes for expansion sleeves.

BRIEF DESCRIPTION OF THE DRAWINGS

Exemplary embodiments of the present invention are detailed below with references to the attached drawings, which are incorporated herein by reference.

DETAILED DESCRIPTION OF THE INVENTION

Figure 1:
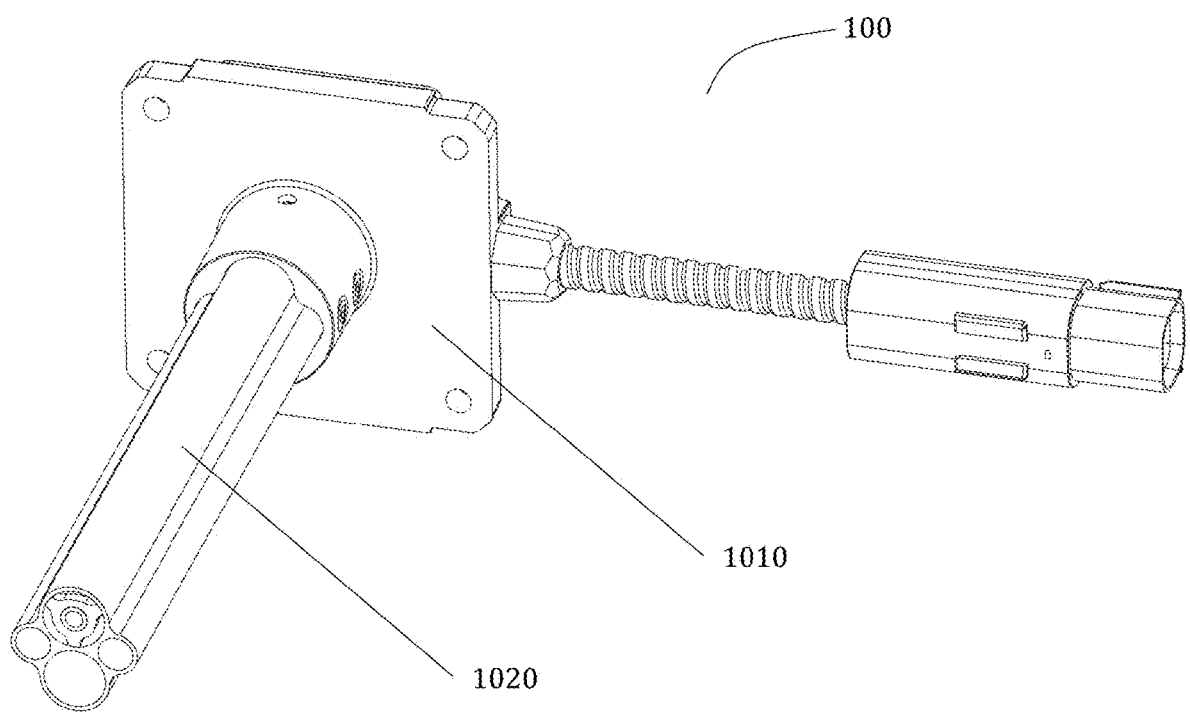
FIG. 1 shows an exemplary general view of the preferred embodiment of the claimed capacitive level sensor.

There are embodiments of the present invention below to explain its implementation examples in particular embodiments. Nevertheless, this disclosure itself is not intended to limit the scope of the rights granted by this patent. It should rather be assumed that the claimed invention can also be implemented in other ways so that the claimed invention will include different elements and conditions or combinations of elements and conditions similar to the elements and conditions described herein in combination with other existing and future technologies.

According to the preferred embodiment of the present invention, there is provided a capacitive level sensor comprising a base; a sensitive element; therewith the base comprises at least first part having a recess with a cover to hermetically house a computing unit, as well as a hole for the computing unit's output cable; second part having holes for expansion sleeves mostly in the center, in the area of the first part, holes for fasteners in the side, vent holes in the side; therewith the sensitive element is an electrode housing, which is a metal section formed by at least two tubes of equal or unequal length that are connected to each other at least partially along the length of said metal section, which optionally comprises at least one stiffener extending along the entire length of said metal section and connecting at least the two adjacent tubes of the section; therewith each tube of the section has either a vent hole aligned axially with the corresponding vent hole in the lateral side of the collar part or a slit aligned axially with the corresponding vent hole in the lateral side of said collar part and arranged at least partially lengthwise at least in one side adjacent to the measured medium; therewith the electrode housing contains electrodes rigidly fixed in each tube of the section, and these electrodes are metal tubes having the same unit-length capacitance but differing in their length, and the main electrode is mostly as long as the electrode housing, and each compensation electrode is shorter than the main electrode; therewith the sensitive element is connected to the base through holes for fasteners; therewith the main electrode and each compensation electrode are connected to the computing unit by means of metal rods connected to expansion sleeves, which are connected to holes for expansion sleeves.

According to an alternative embodiment of the present invention, there is provided said sensor, wherein the base is made of a metal or copolymer or combinations thereof.

According to another alternative embodiment of the present invention, there is provided said sensor, wherein the connection between the metal rods and expansion sleeves is a thread joint.

According to another alternative embodiment of the present invention, there is provided said sensor, wherein the expansion sleeves are made of a dielectric material.

According to another alternative embodiment of the present invention, there is provided said sensor, wherein the connection between the expansion sleeves and holes for expansion sleeves is a thread joint.

According to another alternative embodiment of the present invention, there is provided said sensor, wherein the thread joint between the expansion sleeves and holes for expansion sleeves contains a sealant.

According to another alternative embodiment of the present invention, there is provided said sensor, wherein the expansion sleeves have sealing rings.

According to another alternative embodiment of the present invention, there is provided said sensor, wherein the hole located in the recess and intended for the output cable of the computing unit contains a sealant.

According to another alternative embodiment of the present invention, there is provided said sensor, wherein the vent holes are arranged asymmetrically in terms of their vicinity to the base.

According to another alternative embodiment of the present invention, there is provided said sensor, wherein the main electrode and each compensation electrode are covered with an insulation wrap.

According to another alternative embodiment of the present invention, there is provided said sensor, wherein the sensitive element is formed by connecting at least two geometrically similar sensitive elements of equal or unequal length by means of a coupling sleeve.

According to another alternative embodiment of the present invention, there is provided said sensor, wherein there are coaxial slits, which are cut mostly along the entire length of the coupling sleeve body, in each side of the coupling sleeve body adjacent to said slits in the electrode housing.

According to another alternative embodiment of the present invention, there is provided said sensor, wherein the main electrode and each compensation electrode are made of the same material as the metal rods.

According to another alternative embodiment of the present invention, there is provided said sensor, wherein the main electrode and each compensation electrode, the metal rods, and electrode housing are made of the same material.

According to another alternative embodiment of the present invention, there is provided said sensor, wherein each tube of the section has a slit along its entire length at least in one side adjacent to the measured medium.

According to another preferred embodiment of the present invention, there is provided a sensitive element for the capacitive level sensor, being an electrode housing, which is a metal section formed by at least two tubes of equal or unequal length that are connected to each other at least partially along the length of said metal section, which optionally comprises at least one stiffener extending along the entire length of said metal section and connecting at least the two adjacent tubes of the section; therewith each tube of the section has either a vent hole aligned axially with the corresponding vent hole in the lateral side of the collar part of the base of the capacitive level sensor or a slit aligned axially with the corresponding vent hole in the lateral side of said collar part of the base of the capacitive level sensor and arranged at least partially lengthwise at least in one side adjacent to the measured medium; therewith the electrode housing contains electrodes rigidly fixed in each tube of the section, and these electrodes are metal tubes having the same unit-length capacitance but differing in their length, and the main electrode is mostly as long as the electrode housing, and each compensation electrode is shorter than the main electrode.

According to another alternative embodiment of the present invention, there is provided said sensitive element, wherein the main electrode and each compensation electrode are covered with an insulation wrap.

According to another alternative embodiment of the present invention, there is provided said sensitive element that is formed by connecting at least two geometrically similar electrodes of equal or unequal length by means of a coupling sleeve.

According to another alternative embodiment of the present invention, there is provided said sensitive element, wherein there are coaxial slits, which are cut mostly along the entire length of the coupling sleeve body, in each side of the coupling sleeve body adjacent to said slits in the electrode housing.

According to another alternative embodiment of the present invention, there is provided said sensitive element, wherein the main electrode and each compensation electrode, the electrode housing, and coupling sleeve are made of the same material.

According to another alternative embodiment of the present invention, there is provided said sensitive element, wherein each tube of the section has a slit along its entire length at least in one side adjacent to the measured medium.

According to another alternative embodiment of the present invention, there is provided said sensitive element, wherein each tube of the section has a slit along its entire length at least in one side adjacent to the measured medium.

According to another preferred embodiment of the present invention, there is provided an electrode housing for the capacitive level sensor, being a metal section formed by at least two tubes of equal length that are connected to each other at least partially along the length of said metal section, which optionally comprises at least one stiffener extending along the entire length of said metal section and connecting at least the two adjacent tubes of the section; therewith each tube of the section has either a vent hole aligned axially with the corresponding vent hole in the lateral side of the collar part of the base of the capacitive level sensor or a slit aligned axially with the corresponding vent hole in the lateral side of said collar part of the base of the capacitive level sensor and arranged at least partially lengthwise at least in one side adjacent to the measured medium;

According to another alternative embodiment of the present invention, there is provided said housing, wherein each tube of the section has a slit along its entire length at least in one side adjacent to the measured medium.

According to another preferred embodiment of the present invention, there is provided a measured medium flow monitoring system comprising one or more capacitive level sensors installed in one or more reservoirs with measured media, wherein the sensors are configured to communicate with a server to provide user information about the level in a reservoir in which said sensor is installed.

According to another alternative embodiment of the present invention, there is provided said system, wherein said capacitive sensors and server communicate with each other by means of a transceiver.

According to another alternative embodiment of the present invention, there is provided said system, wherein the transceiver further comprises one or more navigation unit connected to the server, and each navigation unit is associated with said single sensor or a single group of said sensors and configured to transfer information about the location of the corresponding sensor or group of sensors to the server.

According to another preferred embodiment of the present invention, there is provided a reservoir for a measured medium, containing said capacitive sensor optionally comprising said coupling sleeve.

According to another alternative embodiment of the present invention, there is provided a reservoir for a measured medium, containing one or more said capacitive level sensors according to any of said embodiments of the present invention.

According to another preferred embodiment of the present invention, there is provided a method for assembling the capacitive level sensor, consisting of the following steps: (A) connecting the capacitive sensor base with expansion sleeves connected to metal rods; (B) installing the computing unit into the recess for the computing unit in the capacitive sensor base and connecting the computing unit with said metal rods; (C) connecting the output cable to the input of said computing unit; (D) installing the cover protecting the recess for said computing unit and sealing it with a compound through the threaded hole to connect the output cable; (E) screwing the output cable into said threaded hole; (F) pre-calibrating the capacitive sensor after the compound has cured; (G) screwing electrodes onto the metal rods; (H) installing the electrode housing by stringing it on the electrodes and by rigidly fixing the electrode housing in the collar part of the base, therewith the electrodes may be optionally secured inside the electrode housing.

According to another preferred embodiment of the present invention, there is provided said method for assembling, wherein at step (F), the values obtained from the compensation measuring channels, which are one or more channels formed by one or more of the metal rods, are normalized by the value obtained from the main measuring channel, which is the only channel formed by only one of the metal rods, and correction factors are calculated and recorded into the non-volatile memory of the computing unit.

According to another preferred embodiment of the present invention, there is provided said method for assembling, wherein the electrode housing is rigidly fixed with pop rivets in the collar part of the base, and electrodes are secured with spacer rings inside the electrode housing.

According to another alternative embodiment of the present invention, there is provided said method for assembling, wherein at step (G), the electrodes are provided with insulation wrap.

According to another preferred embodiment of the present invention, there is provided a method for pre-calibrating the capacitive level sensor during the assembly of the sensor, consisting of the following steps: (A) measuring the capacitance of the main measuring channel, which is only one of the metal rods connected to the computing unit of the capacitive sensor, as part of the pre-calibration procedure; (B) measuring the capacitance of each compensation measuring channel, which is one or more of the metal rods connected to the computing unit of the capacitive sensor, as part of the pre-calibration procedure; (C) calculating the differences between each capacitance value of the compensation measuring channel and the capacitance value of the main measuring channel by means of a microcontroller of said computing unit; (D) iteratively repeating the operations of steps (A) to (C) for a period in order to obtain a set of primary correction factors; (E) calculating the averaged value of the correction factor by means of said microcontroller, based on the set of primary correction factors and storing the resulting averaged value of the correction factor into the non-volatile memory of said computing unit.

According to another alternative embodiment of the present invention, there is provided said method for pre-calibrating, wherein at step (D), the operations of steps (A) to (C) are repeated for a maximum of 30 minutes.

According to another alternative embodiment of the present invention, there is provided said method for pre-calibrating, wherein at steps (A) and (B), the measured capacitance values may be optionally normalized by the corresponding capacitance values at the reference temperature by using the temperature compensation factor, the value of which has previously been recorded into the non-volatile memory of the computing unit, and at step (C), the resulting normalized capacitance values of the measuring channels are used as the capacitance values of the measuring channels.

According to another preferred embodiment of the present invention, there is provided a method for level measuring by means of the capacitive level sensor, consisting of the following steps: (A) calibrating the sensor in order to obtain calibration values of the capacitance difference and values of the dynamic level range to be recorded into the non-volatile memory of the sensor's computing unit, by using a measured reference medium; (B) measuring the level by means of the calibrated sensor, therewith the measurement consists of the following steps: (B1) filling a reservoir with a measured medium to the level at which the longest compensation channel of the sensor is at least partially immersed in the measured medium, while the measured medium differs from the reference medium; or filling a reservoir with a measured reference medium to any permissible level for this reservoir; (B2) measuring the capacitance values of the main measuring channel and each compensation measuring channel of the sensor for the reservoir that contains the measured medium, therewith each measurement of the capacitance value of each compensation measuring channel is carried out taking into account the average correction factor, the value of which is stored in the non-volatile memory of the computing unit; (B3) calculating values of the capacitance difference by means of the microcontroller of the computing unit by using each capacitance value of the compensation measuring channel obtained at step (B2) and the capacitance value of the main measuring channel obtained at step (B2) pairwise in order to obtain values of the capacitance difference; (B4) comparing the values of the capacitance difference obtained at step (B3) to the calibration values of the capacitance difference and calculating the ratio between these capacitance differences, which is the correction factor, by means of the microcontroller of the computing unit in order to obtain the value of the correction factor; (B5) normalizing each capacitance value of the main measuring channel by the capacitance value of the level by means of the microcontroller of the computing unit by using the correction factor, the value of which was obtained at step (B4), in order to obtain the capacitance value of the level; (B6) using the resulting values of the level by means of the microcontroller of the computing unit in order to determine the relative level according to the values of the dynamic range.

According to another alternative embodiment of the present invention, there is provided said method for level measuring, wherein at step (A), the sensor is calibrated as follows: (A1) installing the sensor in a reservoir that does not contain any measured medium; (A2) measuring the capacitance values of the main measuring channel and each compensation measuring channel of the sensor for the reservoir that does not contain any measured medium, therewith each measurement of the capacitance value of each compensation measuring channel is carried out taking into account the average correction factor, the value of which is stored in the non-volatile memory of the computing unit; (A3) filling the reservoir with a measured reference medium to the maximum permissible level for this reservoir; (A4) measuring the capacitance values of the main measuring channel and each compensation measuring channel of the sensor for the reservoir that contains the measured reference medium, therewith each measurement of the capacitance value of each compensation measuring channel is carried out taking into account the average correction factor, the value of which is stored in the non-volatile memory of the computing unit; (A5) calculating calibration values of the capacitance difference by means of the microcontroller of the computing unit by using each capacitance value of the compensation measuring channel obtained at steps (A2) and (A4) and the capacitance value of the main measuring channel obtained at steps (A2) and (A4) pairwise, based on the values obtained at steps (A2) and (A4), and recording the resulting calibration values of the capacitance difference into the non-volatile memory of the computing unit; (A6) calculating a dynamic level range by means of the microcontroller of the computing unit, based on the values obtained at steps (A2) and (A4) preceding to, simultaneously with, or after step (A5), with the dynamic level range being the difference between the capacitance value of the main measuring channel for the full reservoir and the capacitance value of the main measuring channel for the empty reservoir, and recording the resulting values of the dynamic level range into the non-volatile memory of the computing unit.

According to another alternative embodiment of the present invention, there is provided said method, wherein to obtain normalized capacitance values of the measuring channels for the reservoir that does not contain any measured medium at step (A2), the capacitance values of the measuring channels measured at step (A2) are normalized by the capacitance values of the measuring channels at the reference temperature by means of the microcontroller of the computing unit by using the temperature compensation factor, the value of which has previously been recorded into the non-volatile memory of the computing unit; to obtain normalized capacitance values of the measuring channels for the reservoir that contains the measured reference medium at step (A4), the capacitance values of the measuring channels measured at step (A4) are normalized by the capacitance values of the measuring channels at the reference temperature by means of the microcontroller of the computing unit by using the temperature compensation factor, the value of which has previously been recorded into the non-volatile memory of the computing unit; therewith at steps (A5) and (A6), the corresponding normalized capacitance values of the measuring channels are used.

According to another alternative embodiment of the present invention, there is provided said method, wherein to obtain normalized capacitance values of the measuring channels for the reservoir that contains the measured medium at step (B2), the capacitance values of the measuring channels measured at step (B2) are normalized by the capacitance values of the measuring channels at the reference temperature by means of the microcontroller of the computing unit by using the temperature compensation factor, the value of which has previously been recorded into the non-volatile memory of the computing unit; therewith at step (B3), the corresponding normalized capacitance values of the measuring channels are used.

According to another preferred embodiment of the present invention, there is provided a coupling sleeve for the electrode housing of the capacitive level sensor, being a cylinder that follows the shape of the cross-section of the electrode housing of the capacitive level sensor preferably in its cross-section or at least the cross-section of holes in its base and has slits in its side, which are cut mostly along the entire height of the coupling sleeve and span a larger area of the lateral surface.

According to another alternative embodiment of the present invention, there is provided said coupling sleeve, wherein slit-free portions of the coupling sleeve side are adapted not to obstruct the slits of the electrode housing of said capacitive level sensor when connected to said electrode housing if the electrode housing of said capacitive level sensor has slits.

According to another alternative embodiment of the present invention, there is provided said coupling sleeve that is made of the same material as the electrodes, electrode housing, and connecting rods of the capacitive level sensor.

As an example, but not a limitation, FIG. 1 shows an exemplary preferred embodiment of the claimed capacitive level sensor 100 (the sensor 100). As can be seen from FIG. 1, the claimed sensor 100 generally consists of a base 1010 and an electrode housing 1020, which, when it contains electrodes, is the sensitive element of the sensor 100.

Figure 2:
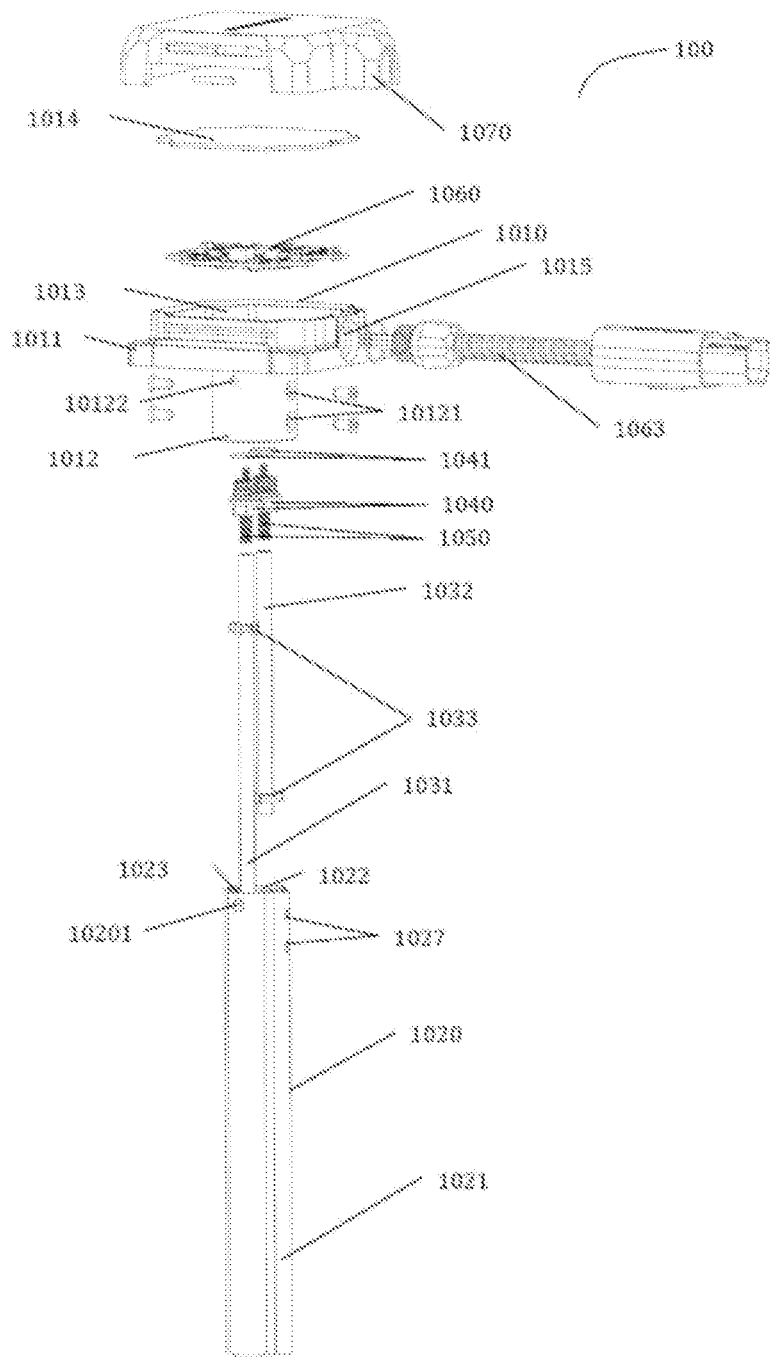
FIG. 2 shows an exemplary general view of components constituting the preferred embodiment of the claimed capacitive level sensor.
Figure 22:
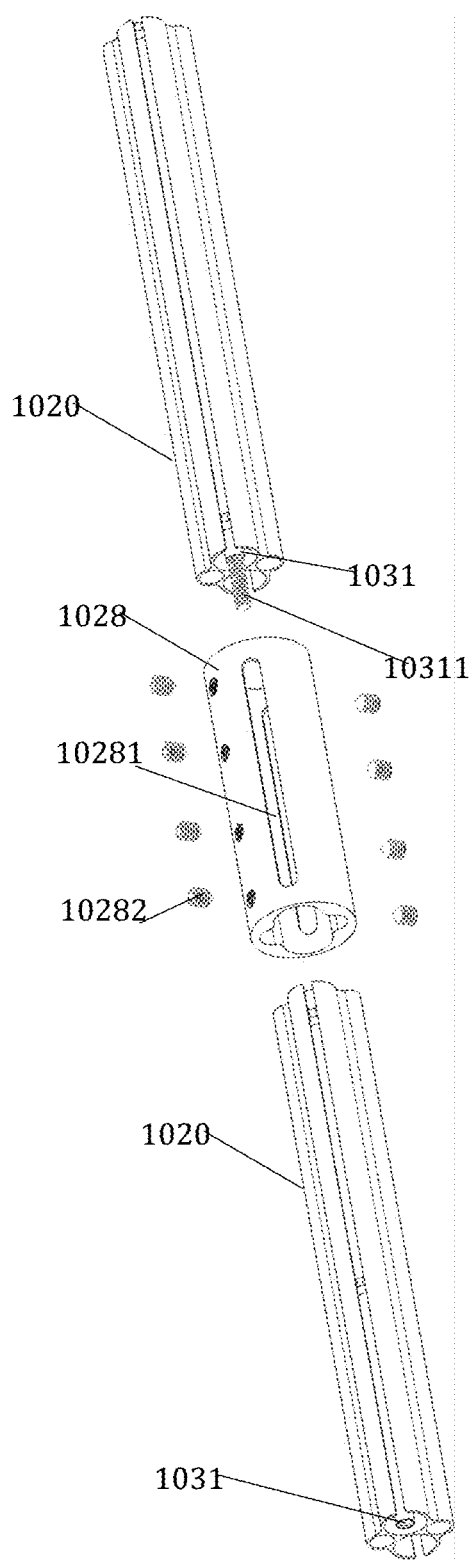
FIG. 22 shows an exemplary method for using a coupling sleeve for the electrode housing of the capacitive sensor.

As an example, but not a limitation, FIG. 2 shows an exemplary general view of components constituting one of the preferred embodiments of the claimed sensor 100. As can be seen from FIG. 2, the components constituting the sensor 100 may represent a base 1010; a housing 1020 for electrodes 1031, 1032, optionally with at least one stiffener 1021 and optionally with at least one coupling sleeve 1028 (FIG. 22); electrodes 1031, 1032 optionally with spacer rings 1033; expansion sleeves 1040 optionally with sealing rings 1041; connecting metal rods 1050; a computing unit 1060.

The base 1010 is designed to house the computing unit 1060, which is detailed below, and to connect the electrodes 1031, 1032 of the sensor to the input of the computing unit 1060. The base 1010 is most typically shaped as a collar flange, the first part of which, for example, without limitation, is a flat part 1011 and may be of any shape (including a circle, ellipse, polygon, etc.), and the second part of which, for example, without limitation, is a collar part 1012 and is shaped as, preferably, but not limited to, a hub with a bore of any shape (including a circle, ellipse, polygon, etc.). As it will become apparent to those skilled in the art upon reading the text below, the shape of the hub and, accordingly, that of the collar part 1012 bore are mainly determined by the cross-section shape of the housing 1020 for the electrodes 1031, 1032 of the sensor and are selected to provide secure fixation of the housing 1020 for the electrodes 1031, 1032 inside the collar part 1012. Aside from this, the base 1010 does not have a through hole in the center of the collar part 1012 as contrasted to a conventional collar flange, but has several threaded through holes (not shown in the drawings), the number of which corresponds to the number of the electrodes 1031, 1032 of the sensor. These threaded holes are arranged to provide such placement of the housing 1020 for the electrodes 1031, 1032 that mounting holes 1022, 1023 of the tubes of the housing 1020 for the electrodes 1031, 1032 are aligned axially with the corresponding threaded holes. To fix the housing 1020 for the electrodes 1031, 1032 to the collar part 1012, there are holes 10121 for fasteners, which may be, not limited to, pop rivets, in the collar part's sides. Aside from this, the collar part 1012 has preferably, although not necessarily vent holes 10122 in its opposite sides as well. These vent holes are preferably arranged asymmetrically in terms of their vicinity to the flat part 1011 and are designed to allow a gas (a mixture of gases) to enter the housing 1020 for the electrodes 1031, 1032 and to provide the same level of a measured medium in communicating vessels, one of which is said housing 1020, and the other is a reservoir for a measured medium. Aside from this, the flat part 1011 has a recess 1013 for the computing unit 1060 on the side reverse to the side on which the collar part 1012 is located. As it will become apparent to those skilled in the art upon reading the text below, the recess 1013 may be of any shape (including a circle, ellipse, polygon, etc.), and it is mainly determined by the shape of the printed circuit board of the computing unit 1060. Nevertheless, the shape of the recess 1013 should allow the recess to be securely sealed with a compound after the installation of the computing unit 1060, followed by the installation of a cover 1014 for the recess 1013. Aside from this, the shape of the recess 1013 should allow a connector-equipped output cable 1063 of the computing unit 1060 to go through a hole 1015 in the recess 1013. Aside from this, the recess 1013 with the computing unit 1060 installed therein and covered with the cover 1014 for the recess 1013 may be further covered with a cover 1070 preferably made of copolymer materials, such as polyacetal, polyamide, polycarbonate, or similar materials, and shaped to provide for sufficient coverage of the recess 1013.

The base 1010 is preferably made of a metal. Nevertheless, if sufficient stiffness is provided, the base 1010 may also be made of a copolymer or its combinations, including those with a metal. Preferably, the base 1010 is injection molded or milled.

Figure 3:
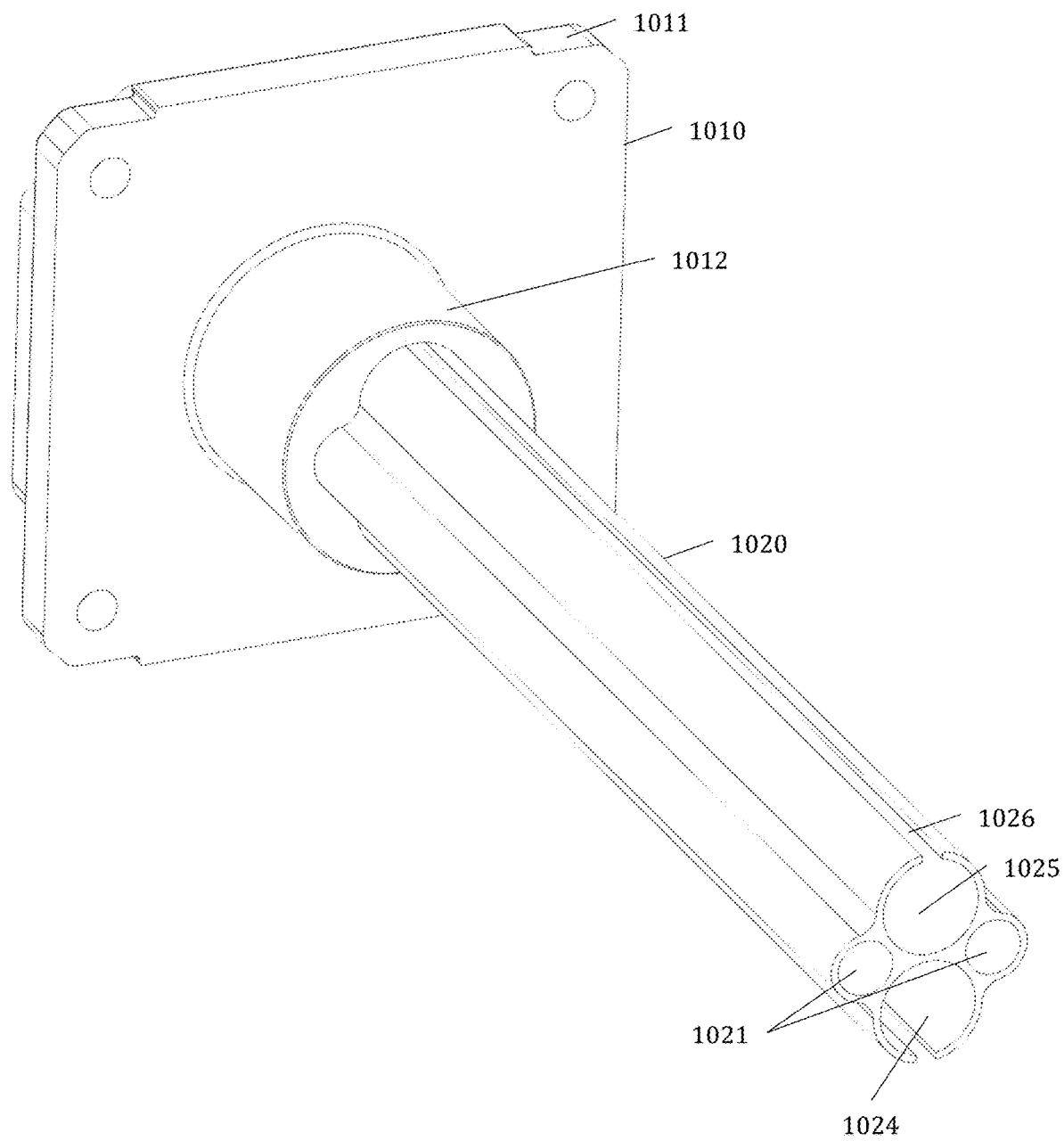
FIG. 3 shows an exemplary sectional view of the electrode housing for the preferred embodiment of the claimed capacitive level sensor.
Figure 4:
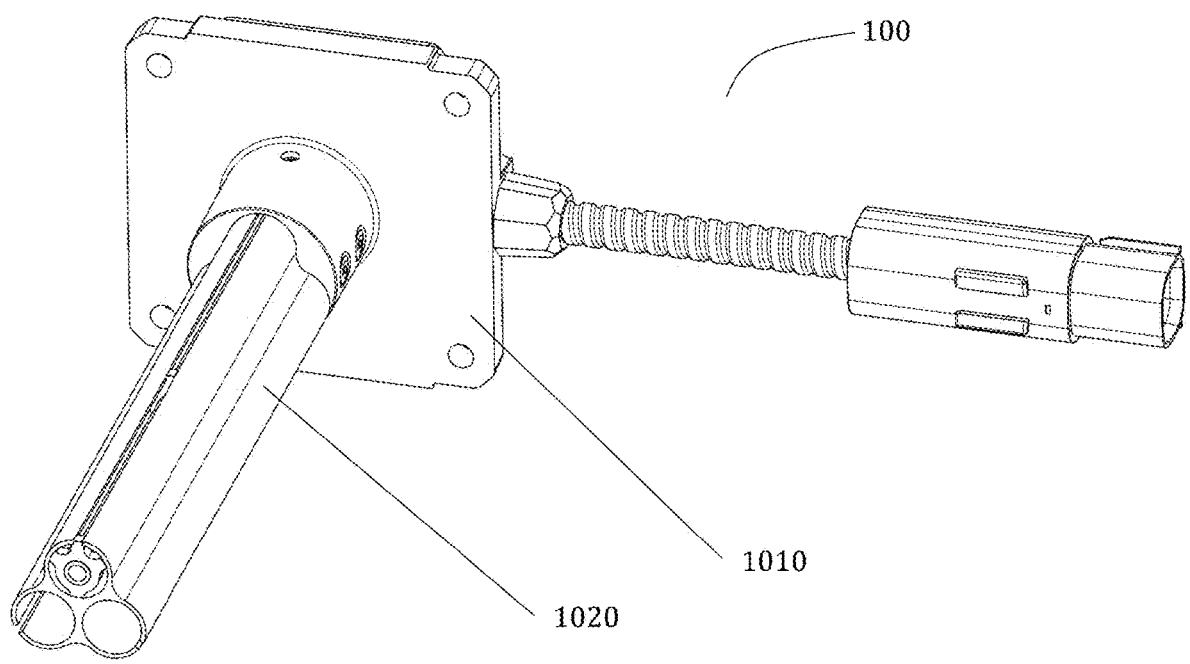
FIG. 4 shows an exemplary general view of the first alternative embodiment of the claimed capacitive level sensor.

The housing 1020 for the electrodes 1031, 1032 (the housing 1020) is a metal section formed by at least two tubes of equal or unequal (e.g. when there is no coupling sleeve, and the compensation electrode 1032 is shorter than the main electrode 1031) length that are connected to each other at least partially along the length of said metal section. The housing 1020 may optionally comprise one or more stiffeners 1021 that preferably, although not necessarily extend along the entire length of the housing 1020 and are in contact with each tube or at least with two adjacent tubes. Said tubes have mounting holes 1022, 1023, and inlet holes 1024, 1025 (not shown in FIG. 2). As can be seen from FIG. 2, there are preferably vent holes 10201 in the place where said housing 1020 connects to said collar part 1012 of said base 1010. These holes are to be aligned axially with the corresponding vent holes 10122 in the collar part 1012, thereby allowing air to enter said housing 1020. Aside from this, each tube may have at least one slit 1026 (for example, FIG. 3) arranged at least partially lengthwise at least in one side adjacent to the measured medium. The slit 1026 is preferably cut along the entire length of each tube. The slit width is preferably up to 15 mm. Although it is also preferable that the slits 1026 in each tube are arranged symmetrically or at equal angles to each other, nevertheless, the slits 1026 may be arranged otherwise, for example, without limitation, at unequal angles to each other. At the same time, the main purpose of the slits 1026 is to provide access of a measured medium to the housing 1020 from the side of each tube containing the electrode 1031 or 1032. On this basis, the slits 1026 should be aligned axially with the vent holes 10122 in the place where said housing 1020 connects to said collar part 1012 of said base 1010, thereby allowing a gas (a mixture of gases) to enter said housing 1020. There are holes 1027 in the base of the housing 1020. These holes are aligned axially with the holes 10121 in the collar part 1012 of the base 1010, through which the housing 1020 and the base 1010 are fastened together. Thus, as contrasted to the prototype and similar devices, the presence of the slit 1026 enables inertia-free measurements and rules out the clogging of the tube due to measured medium paraffinization, which will consequently lead to a greater increase in the reliability and manufacturability of the design as well as to an increase in the accuracy of level measurements.

As an example, but not a limitation, FIG. 3-21 shows possible exemplary cross-sections of the tubes forming the housing 1020. In this case, it is preferable, although not necessarily that the shape of the electrodes 1031, 1032 also changes depending on the tube cross-section to correspond to the cross-section of the tubes forming the housing 1020—owing to this, a larger area of the capacitor can be provided, which will allow more accurate measurements. At the same time, although the possible exemplary cross-sections of the tubes (see FIG. 3-21) forming the housing 1020 have the slits 1026, the tubes should have the corresponding vent holes 10201, and the access of a measured medium to the inside of said tubes is provided by the inlet holes 1024, 1025.

Figure 5:
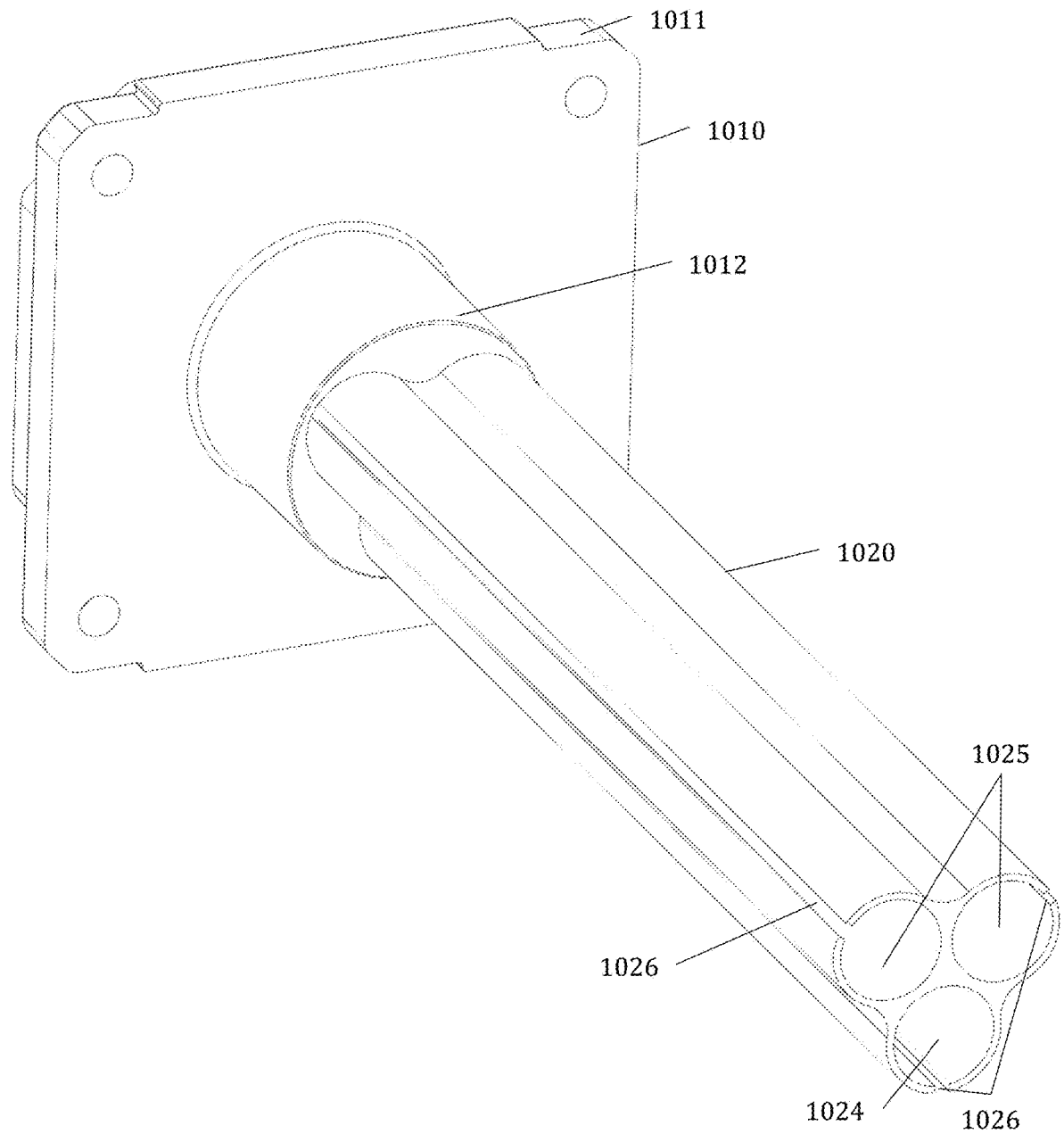
FIG. 5 shows an exemplary sectional view of the electrode housing for the first alternative exemplary embodiment of the claimed capacitive level sensor.
Figure 6:
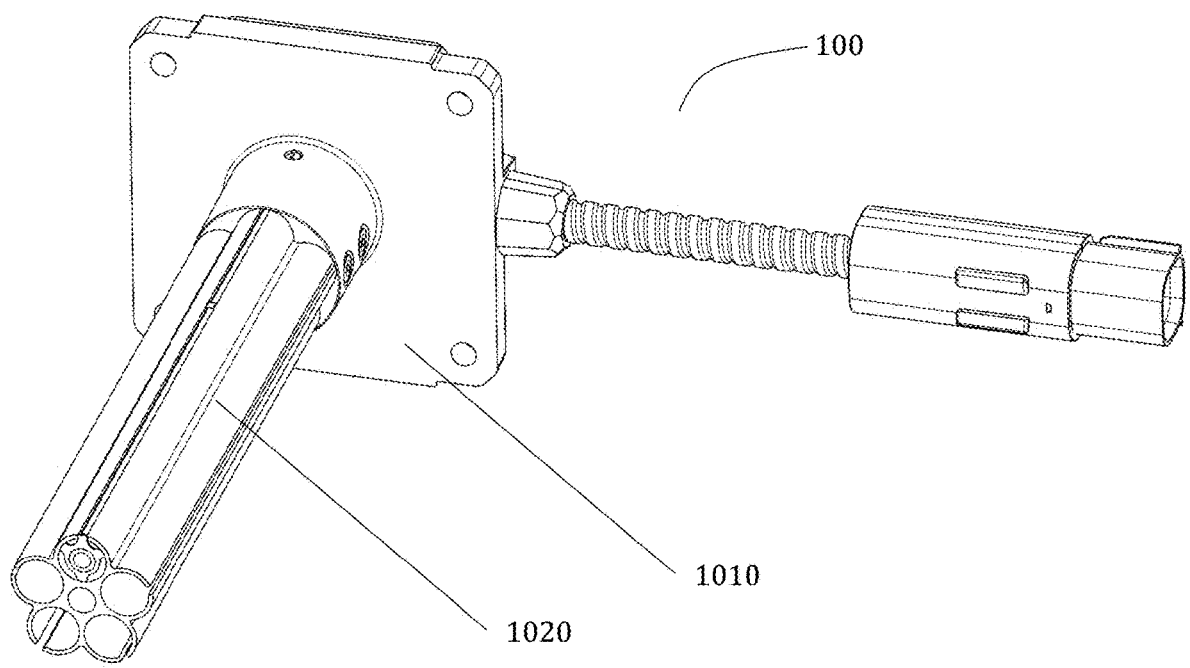
FIG. 6 shows an exemplary general view of the second alternative embodiment of the claimed capacitive level sensor.
Figure 7:
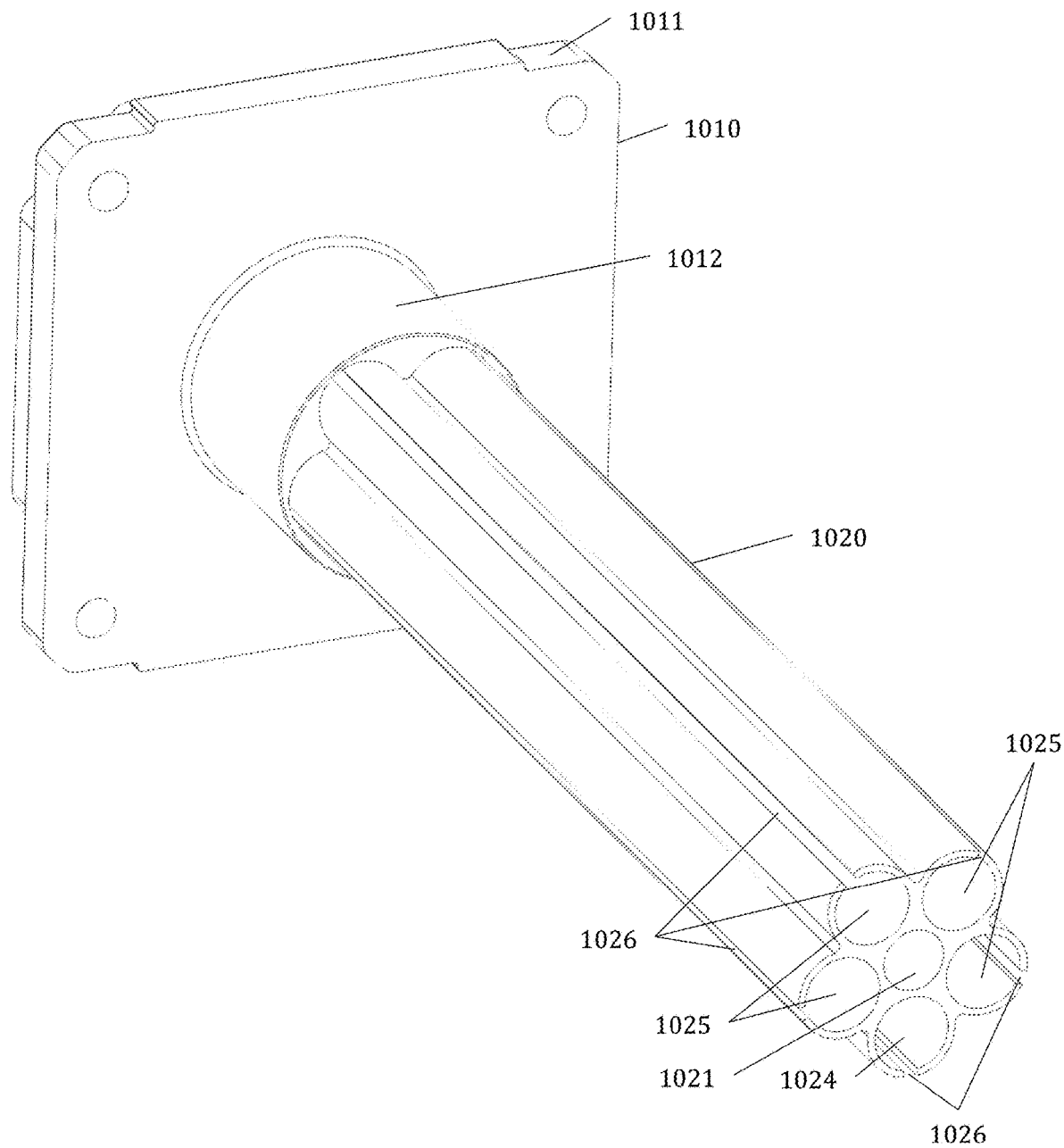
FIG. 7 shows an exemplary sectional view of the electrode housing for the second alternative exemplary embodiment of the claimed capacitive level sensor.
Figure 8:
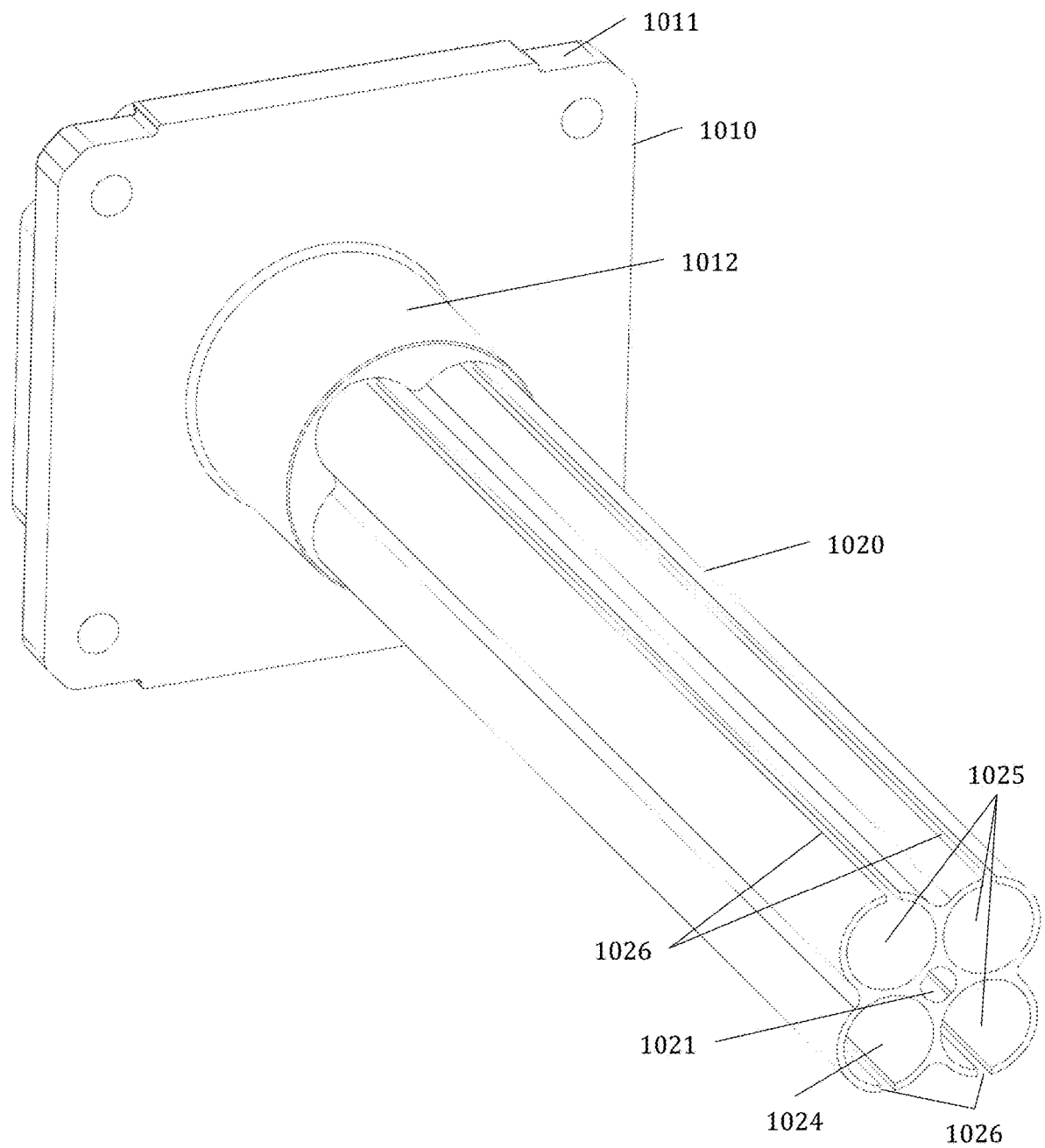
FIGS. 8 to 11 show an exemplary sectional view of the electrode housing for other alternative exemplary embodiments of the claimed capacitive level sensor.
Figure 9:
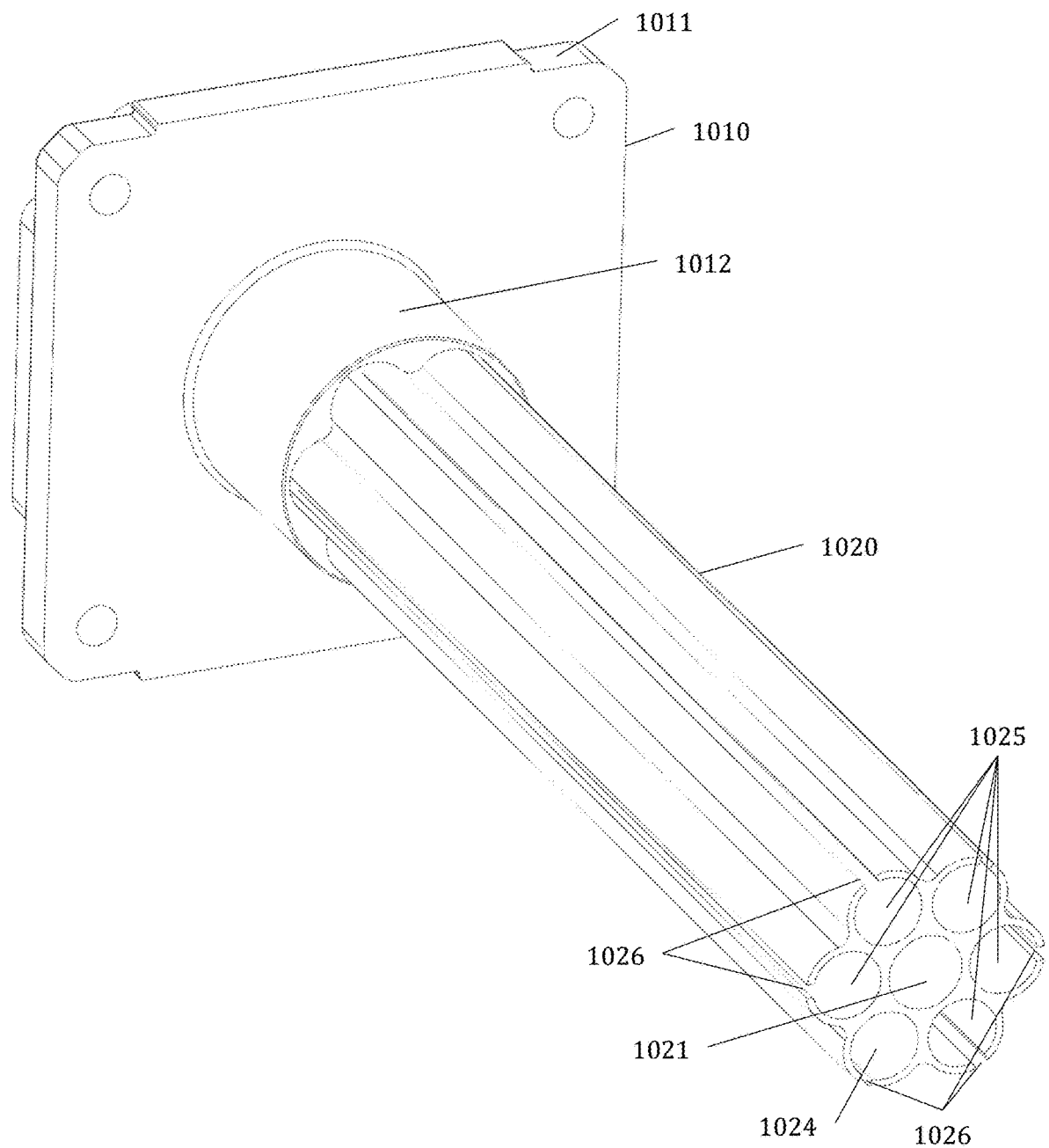
Figure 10:
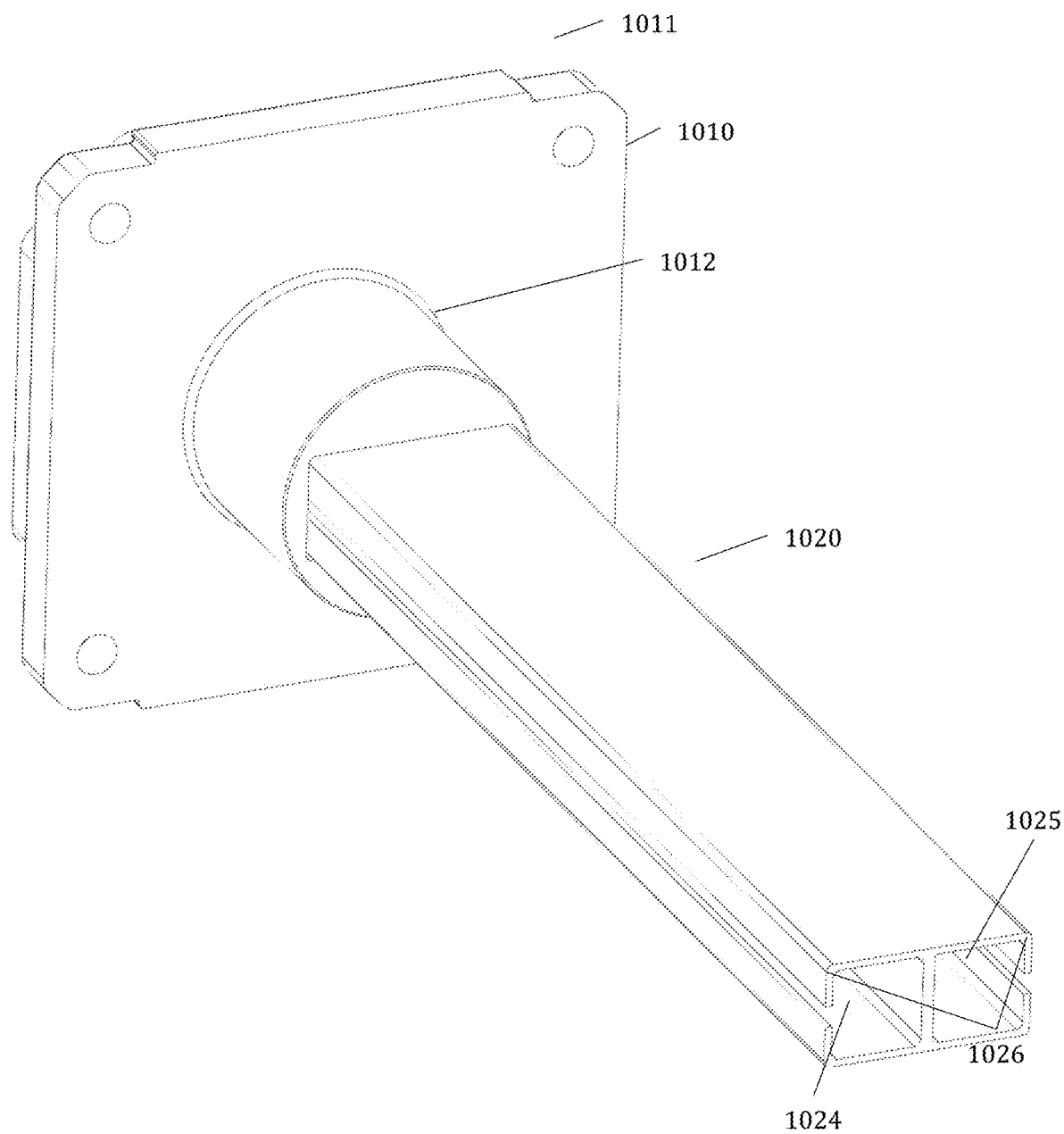
Figure 11:
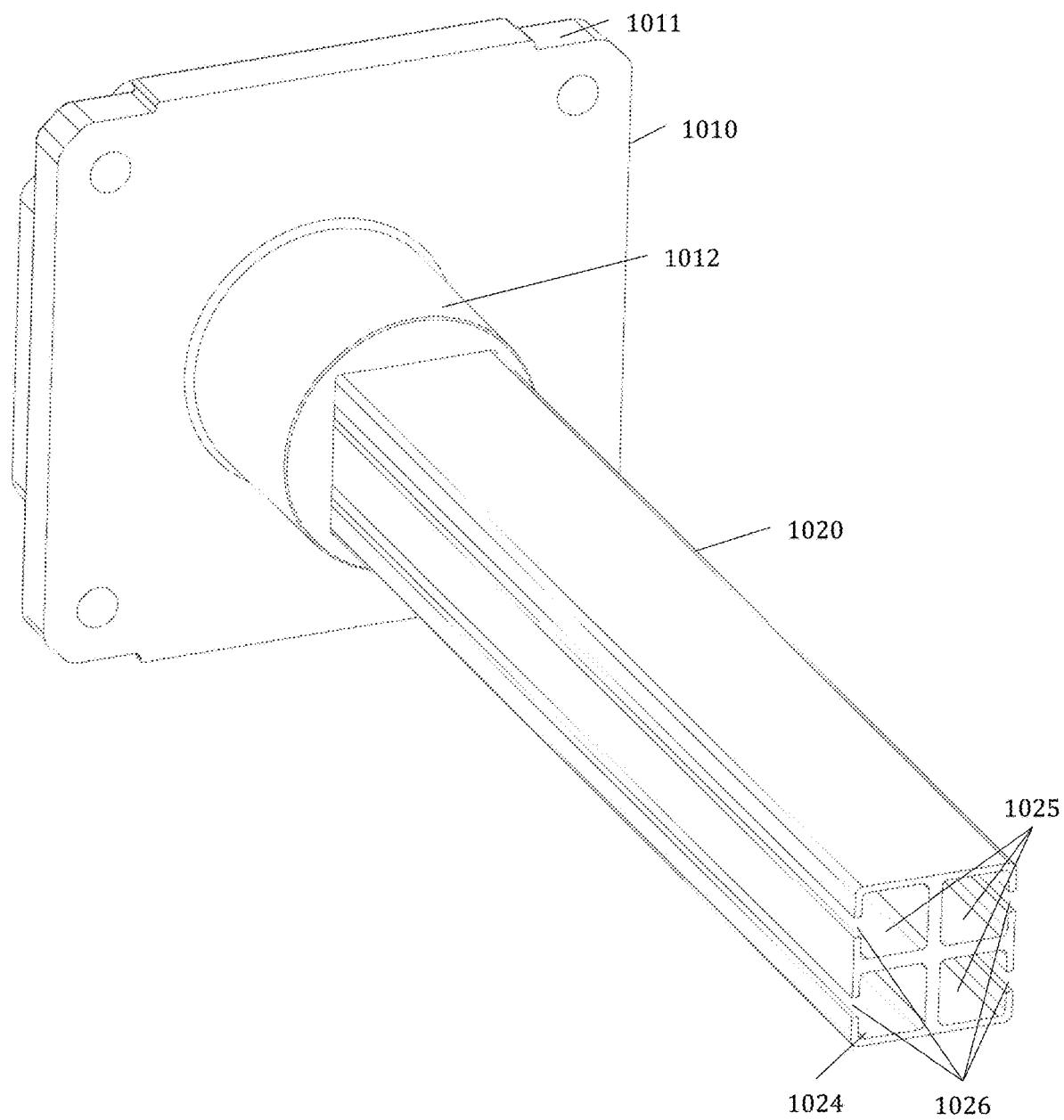
Figure 12:
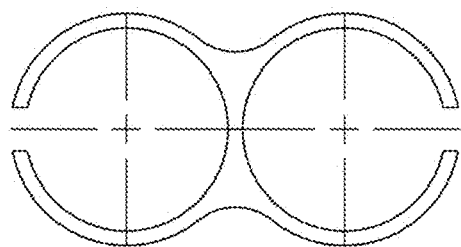
FIGS. 12 to 21 schematically show other exemplary sectional views of the electrode housing for other alternative exemplary embodiments of the claimed capacitive level sensor.
Figure 13:
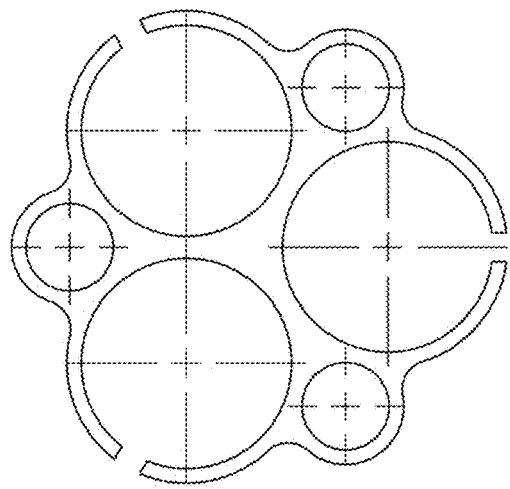
Figure 14:
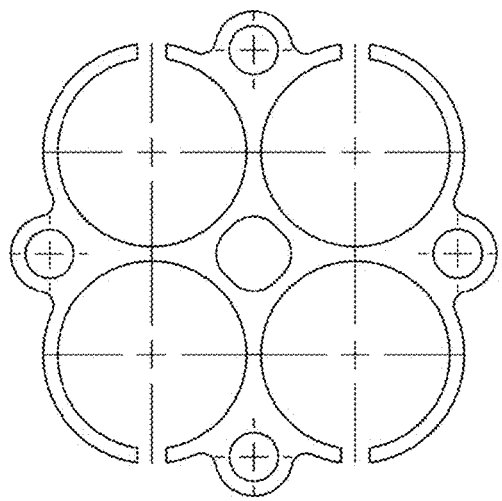
Figure 15:
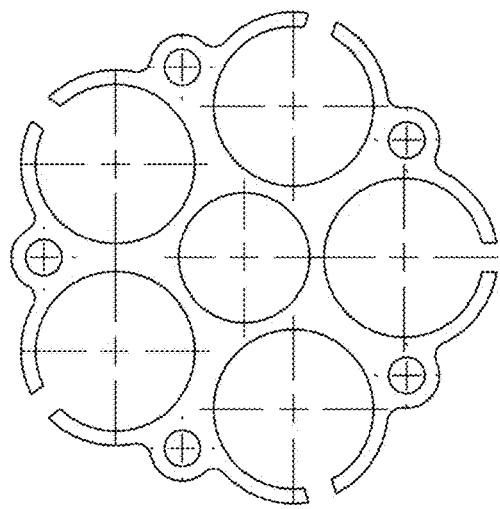
Figure 16:
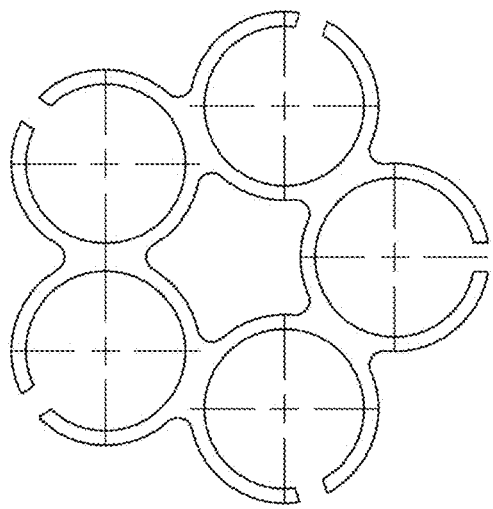
Figure 17:
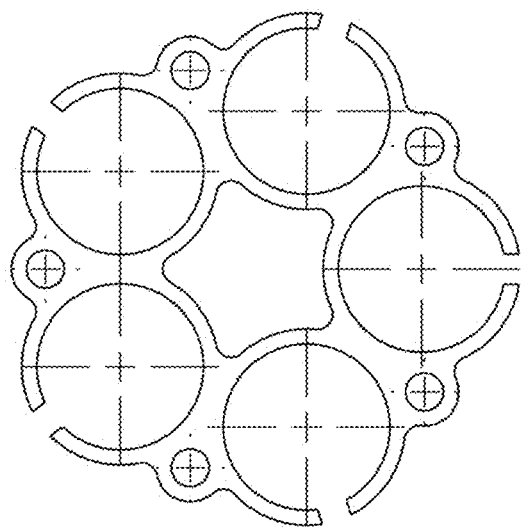
Figure 18:
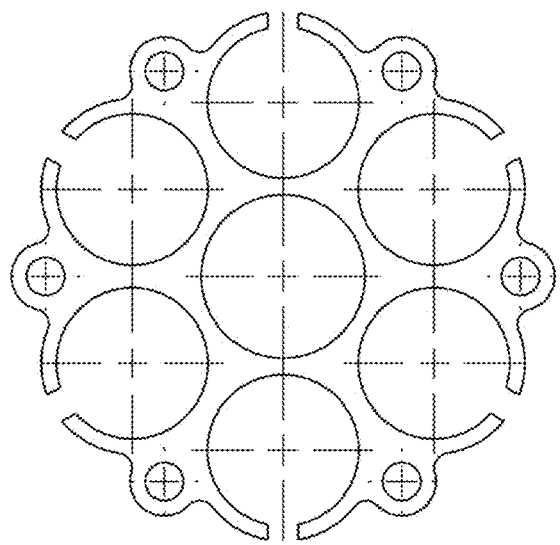
Figure 19:
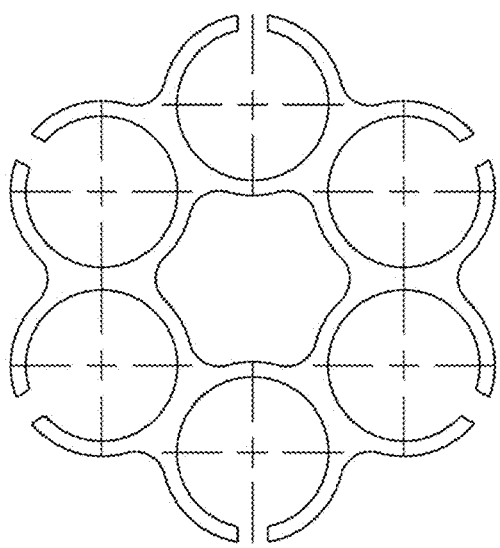
Figure 20:
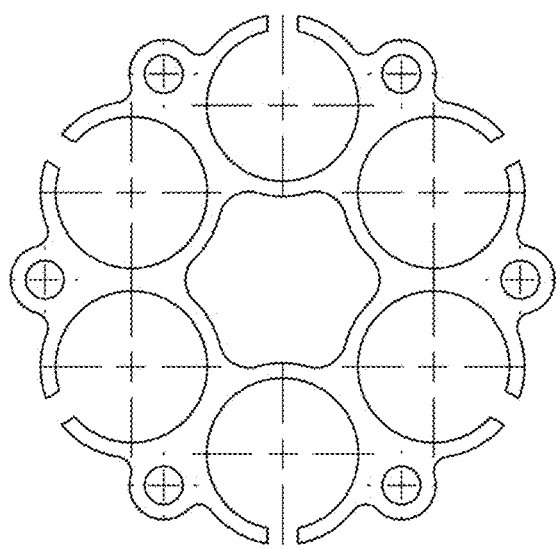
Figure 21:
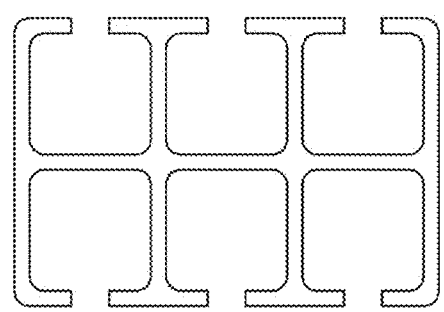

Thus, said vent holes 10201 and slits 1026 are equivalent in their primary purpose. Given that the cross-section may be of any shape (including a circle, ellipse, polygon, etc. or their combinations) and that there may be more than two electrodes 1031 or 1032, it should be apparent to those skilled in the art that the main principle of designing the housing 1020 says that the housing 1020 should have sufficient bending stiffness as a whole, provide secure and rigid fixation of the electrodes 1031, 1032 inside the tubes and allow cutting the slit(s) 1026. These requirements are most relevant in the case of a large length of the housing 1020, since a very long housing 1020 may bend along its length during operation, which will affect the geometry of the sensitive element formed by the outer surface of the housing 1020 and electrodes 1031, 1032 placed inside its tubes. Such a change in the geometry leads to a significant decrease in the measurement accuracy and reduces the serviceability of the sensor as a whole. To provide sufficient bending stiffness, the housing 1020 may optionally be supplemented with at least one stiffener 1021. As previously stated, such a stiffener 1021 extends along the entire length of the housing 1020 at the point of contact of at least two tubes. This stiffener provides further bending stiffness and prevents undesirable changes in the geometry of the sensitive element. In some cases, for example, as shown in FIG. 5, 10, 11, 12, 21, the cross-section of the housing 1020 is shaped to provide sufficient bending stiffness, and no stiffener 1021 is required. The cross-section of the stiffener 1021 is also shaped to provide sufficient bending stiffness of the housing 1020 as a whole. As an example, FIG. 8, 14, 16, 17, 19, 20 show some cross-sections of the stiffener 1021 that differ from a circle.

The sensitive element of the sensor 100 is formed by placing the electrodes 1031 and 1032 in the housing 1020, which thus form several capacitive measuring channels, one of which is the main channel, and the rest are compensation channels. The electrodes 1031 and 1032 are identical in their parameters, in particular, they have the same unit-length capacitance, but they differ in their length. The electrode 1031 is main and mostly as long as the housing 1020, while the electrode(s) 1032 are compensatory and shorter, in particular, but not limited to, much shorter than the electrode 1031. Preferably, the electrodes 1031, 1032 are rigidly fixed inside the corresponding tubes of the housing 1020. In some cases, the electrodes 1031, 1032 may be secured by stringing spacer rings 1033 on them. These spacer rings protrude at their edges, so they at least partially form a stop to the tube wall and at least partially secure the ring with the protrusion in the slit 1026. Said spacer rings 1033 are preferably placed in such a way as to provide the best alignment of the electrode 1031 or 1032 inside the corresponding tube of the housing 1020. At the same time, it should be apparent to those skilled in the art that depending on the length of the electrodes 1031, 1032, either one spacer ring 1033 (if the electrode is short, as for the electrodes 1032) or several spacer rings 1033 (if the electrode is long, as for the electrode 1031) may be used to provide its rigid fixation inside the tube of the housing 1020. At the same time, it should be assumed that the number of spacer rings 1033 should minimally affect the measurement accuracy, but fix the electrodes 1031, 1032 inside the tubes of the housing 1020 rigidly enough to maintain the stable geometry of the sensitive element of the sensor 100.

Said electrodes 1031, 1032 are tubes made of a metal. If the sensor 100 is used for level measurements and one of the measured media is a dielectric liquid, for example, not limited to kerosene, gasoline, other fuels, then the electrodes 1031, 1032 do not require further improvements. However, if the sensor 100 is used for level measurements and one of the measured media is a conducting liquid, for example, not limited to water, then the electrodes 1031, 1032 are further provided with an insulation wrap along their entire length, such as, for example, not limited to a fluoroplastic sheath.

The measuring channels are connected to the input of the computing unit 1060 by means of threaded metal rods 1050, on which expansion sleeves 1040 preferably made of a dielectric material are screwed as shown in FIG. 2. The expansion sleeves 1040 may optionally have sealing rings 1041. The upper part of the expansion sleeves 1040 is threaded, and this allows a thread joint between said expansion sleeves and threaded holes in the flat part 1011 of the base 1010. Nevertheless, it should be assumed that the connection between the electrodes 1031, 1032, and computing unit 1060 must be sealed, and it should be apparent to those skilled in the art that only a particular implementation of such a connection is demonstrated above. On the side of the recess 1013 (and, accordingly, on the side of the computing unit 1060), the metal rods 1050, which are thus extensions of the electrodes 1031, 1032, are electrically connected to the input of the computing unit 1060 by installing and fixing the electrodes 1031, 1032 in the expansion sleeves 1040 by means of, for example, not limited to nuts, split washers or a thread-locking fluid.

The length of the housing 1020 can be significantly increased with the coupling sleeve 1028 (FIG. 22), which is a cylinder that follows the shape of the cross-section of the housing 1020 preferably in its cross-section or at least the general cross-section of holes in its base and has coaxial slits 10281 in its side, which are cut mostly along the entire height of the coupling sleeve and span a larger area of the lateral surface. Thus, it should be assumed that such a coupling sleeve 1028 minimally affects the general geometry of the sensitive element of the sensor 100, especially since said coupling sleeve is much shorter than the housing 1020. At the same time, those portions of the coupling sleeve 1028 side that do not have the slits 10281 are designed in such a way that when connected to the housing 1020, the slits 1026 of the housing 1020 are not obstructed if they are in the housing 1020. The coupling sleeve 1028 is designed to securely and rigidly connect the two housings 1020, which are identical in their geometry and optionally in their length, to each other. For the electrode 1031 (and the electrode 1032, if necessary), two parts of the electrode 1031 are connected to each other by means of a metal rod 1029, for example, not limited to a metal rod similar to the metal rod 1050, with similar fasteners. The coupling 1028 is connected to the corresponding parts of the housing 1020, for example, without limitation, by means of clamping screws 10282.

Preferably, although not necessarily, the electrodes 1031, 1032, housing 1020, coupling sleeve 1028, and connecting rods 1050 are made of the same material.

Figure 23:
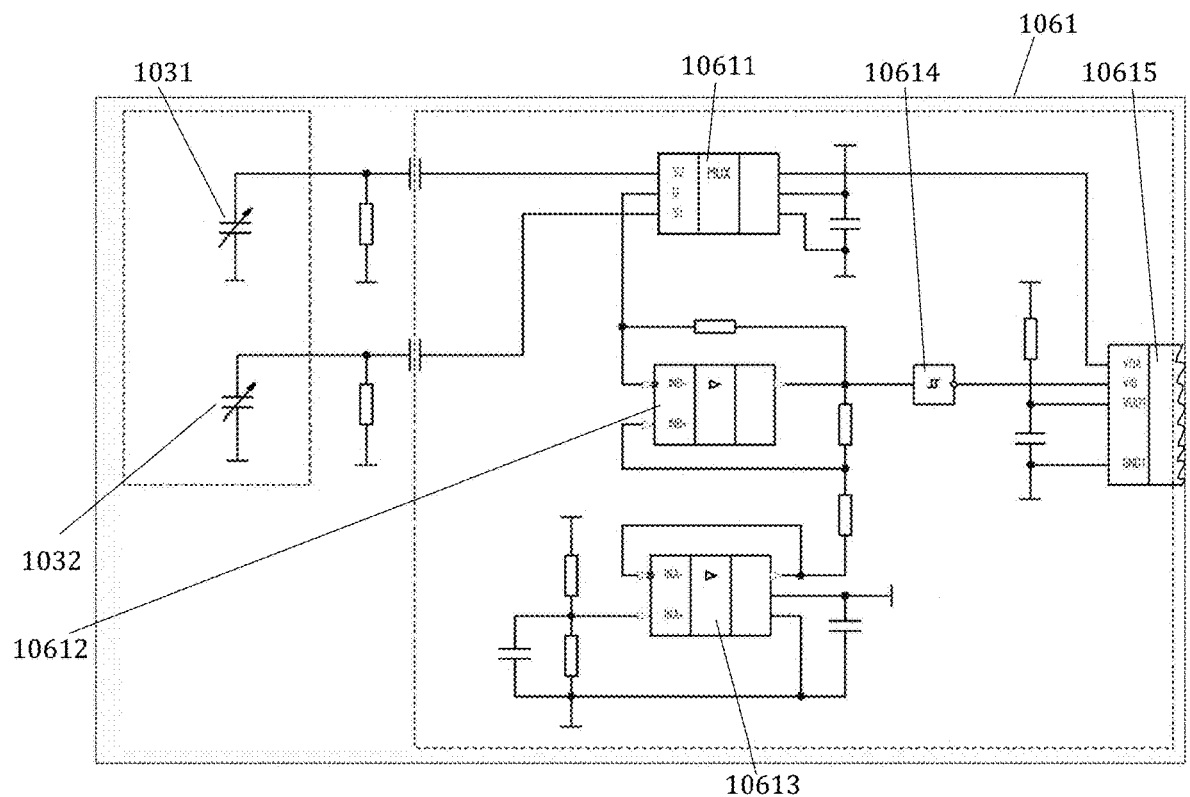
FIGS. 23 and 24 show an exemplary schematic diagram of the claimed capacitive level sensor.
Figure 24:
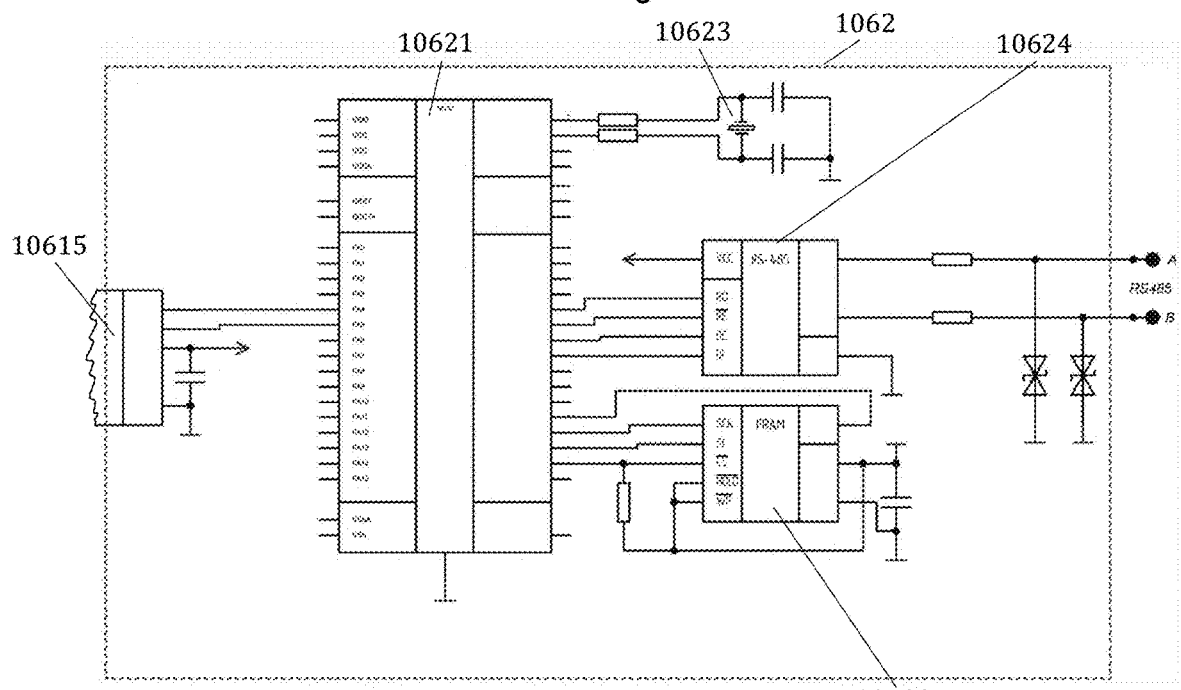

The computing unit 1060 is used to generate a magnetic field in the sensitive element of the sensor 100 and to convert the received analog signal into a digital signal, which can be transmitted to a visualization unit or a liquid flow monitoring system. As shown in FIGS. 23 and 24, the computing unit 1060 most typically comprises an analog part 1061 and a digital part 1062. The analog part 1061 most typically comprises an RC generator formed by resistors and capacitors of the measuring channels 1031, 1032, an optional capacitive galvanic insulator formed by capacitors C1, C3 and designed for protection against a short circuit at the input of the computing unit 1060 for cases where the measured medium is flammable, an analog key 10611 designed to switch between the measuring channels 1031, 1032, therewith a larger number of inputs of the analog key 10611 and, respectively, further capacitors to provide further capacitive galvanic insulators may be provided depending on the number of the measuring channels, a comparator 10612 designed to detect frequency pulses coming from the RC generator and having a higher amplitude than a certain preset threshold voltage and to calculate them subsequently, a reference voltage source 10613 designed to provide a stable reference voltage, an optional rectangular pulse generator 10614 designed to equalize non-rectangular pulses detected by the comparator, and a galvanic insulator 10615 (of capacitive or inductive type) designed for protection against a short circuit at the output of the analog part 1061 of the computing unit 1060 for cases where the measured medium is flammable. The digital part 1062 most typically comprises a microcontroller 10621 connected to non-volatile memory 10622, a crystal oscillator 10623, and an interface 10624, for example, not limited to an RS-485 interface. At the same time, it should be apparent to those skilled in the art that the non-volatile memory, interface, and crystal oscillator may be either independent electronic components or components that are part of the microcontroller as such. At the same time, as can be seen from FIGS. 23 and 24, as an example, but not a limitation, the galvanic insulator 10615 may be equipped with filtering power capacitors designed to increase the reliability of the computing unit 1060 circuit. In turn, as an example, but not a limitation, the connection circuit of the non-volatile memory 10622 may comprise a resistor to provide the selection of the operating mode and a filtering power capacitor designed to increase the reliability of operation. In turn, as an example, but not a limitation, the crystal oscillator 10623 may comprise a binding tie formed by impedance-equalizing resistors designed to provide the frequency stability of the crystal oscillator of capacitors. In turn, as an example, but not a limitation, the interface 10624 at the input of the computing unit 1060 circuit may comprise resistors for protection against electrostatic and conductive interference, equipped with suppressors (protective diodes) designed for protection against electrostatic discharges and conductive interference of large amplitude.

Figure 25:
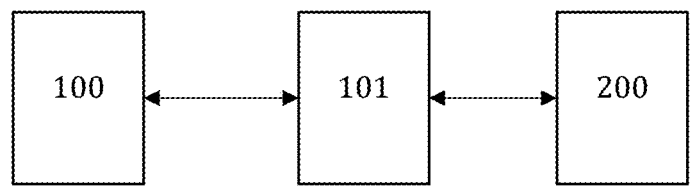
FIG. 25 shows an exemplary general diagram of a liquid flow monitoring system.
Figure 26:
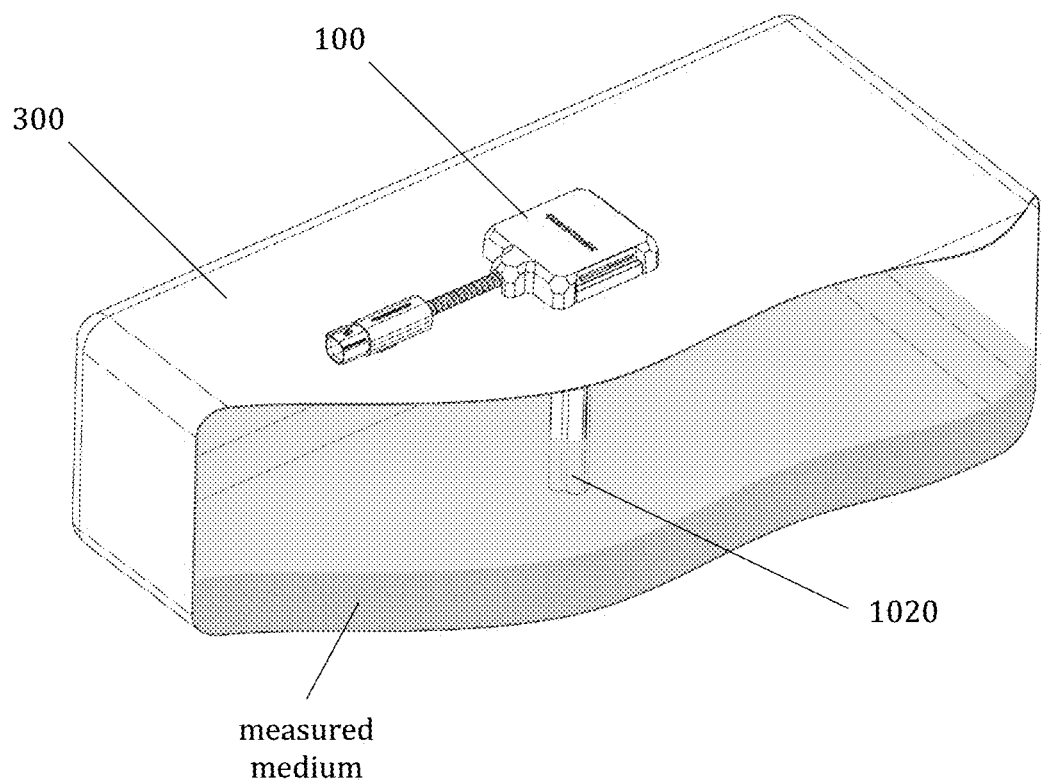
FIG. 26 shows the most typical exemplary placement of the claimed capacitive level sensor in a reservoir with a measured medium.
Figure 27:
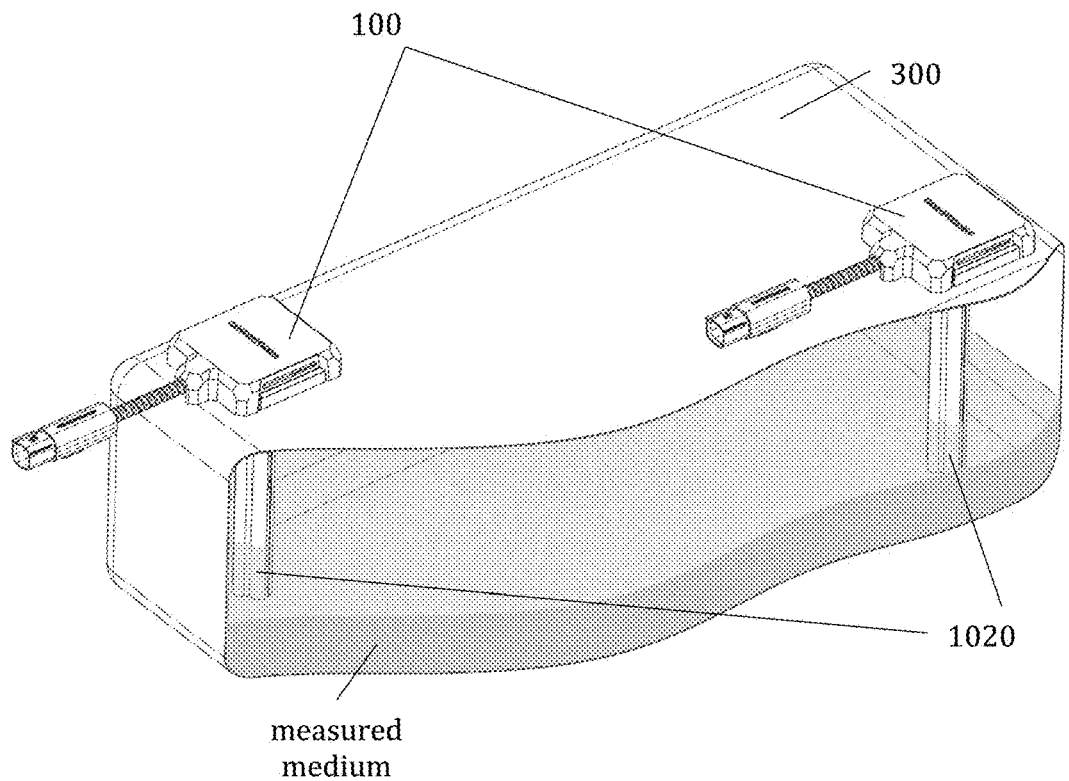
FIG. 27 shows the most typical exemplary placement of the several claimed capacitive level sensors in a reservoir with a measured medium.
Figure 28:
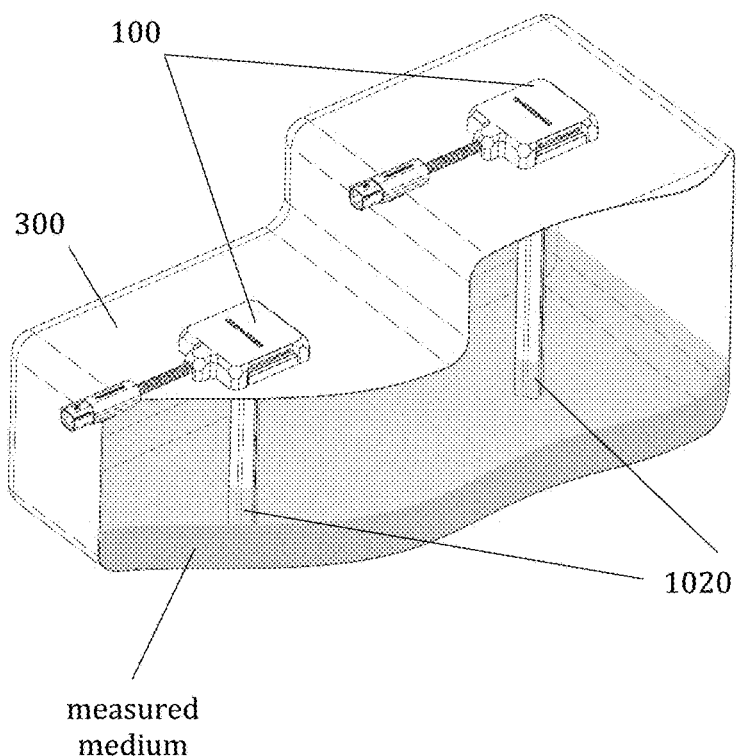
FIG. 28 shows the most typical placement of the several claimed capacitive level sensors in an irregularly shaped reservoir with a measured medium.
Figure 29:
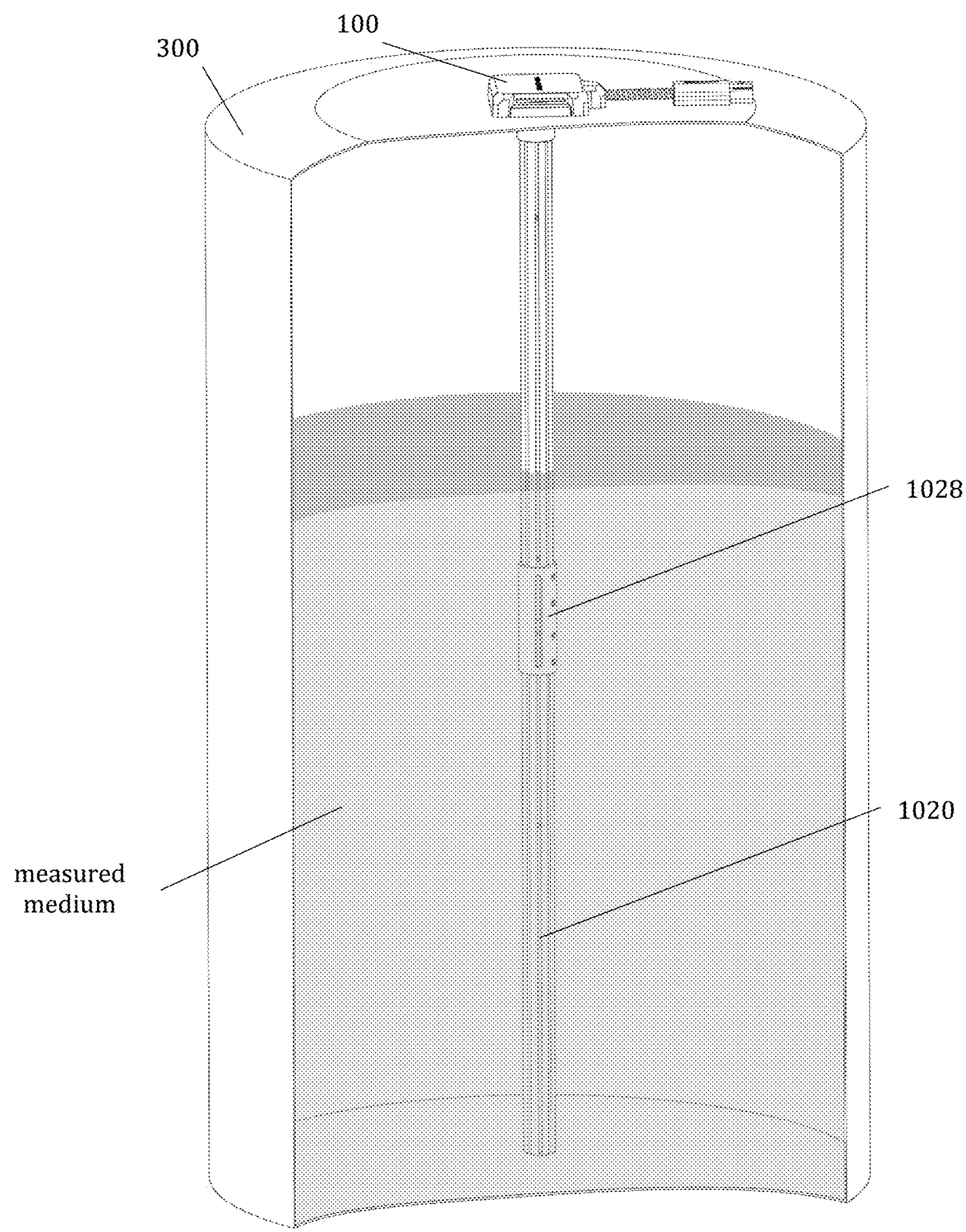
FIG. 29 shows the most typical exemplary placement of the claimed capacitive level sensor in a vertical reservoir with a measured medium.

The digital signal generated by the computing unit 1060 during measurements is transmitted via the output cable 1063 to a visualization unit for displaying the current measurements and/or a liquid flow monitoring system. As shown in FIG. 25, such a liquid flow monitoring system 200 may most typically comprise one or more sensors 100 and a server 200. In this case, the sensors 100 are connected to a transceiver 101 or a plurality of transceivers 101 providing a wired or wireless or combined connection of the sensors 100 to the server 200. Such a transceiver is configured to transmit information coming from the output cable 1063 of the sensor 100 to the server 200. In some cases, such a transceiver 101 may be equipped with navigation equipment to further transmit information about the location of the corresponding sensor 100 to the server. In turn, the server 200, which is most typically a computer device comprising a processor, memory, and optionally input/output devices, is configured to receive information from the corresponding transceivers 101, process it, and provide information about the status and/or location of each sensor 100, including through a web interface.

FIGS. 26 to 29 show exemplary ways of placing the sensor(s) 100 in a reservoir 300 with a measured medium. Such a reservoir 300 may be any suitable container, such as, but not limited to a canister, including a fuel canister, a tank, including a fuel tank or a rocket fuel tank, a tank vehicle, including a road tank vehicle or a rail tank car, a reservoir, including a tanker tank or an underground tank, etc. The upper wall of a suitable reservoir is at least partially solid. The sensor 100 is rigidly mounted on the base 1010 in this solid part so that the sensitive element (the housing 1020 with the electrodes 1031, 1032) is vertically oriented and is located mostly in the central part of the reservoir 300. To provide sufficient measurement accuracy, the reservoir 300 may contain several sensors 100 (FIG. 27) depending on the reservoir 300 dimensions. Aside from this, the housing 1020 is extended by means of a similar housing through the coupling sleeve 1028 (FIG. 29) depending on the reservoir 300 geometry. Aside from this, when using several sensors 100 in one reservoir 300 of a mostly constant perimeter geometry (FIG. 27), it is preferable to place the sensors 100 in opposite corners of the reservoir. Aside from this, when using several sensors 100 in one reservoir 300 of an inconstant perimeter geometry, e.g. with different heights in its different portions (FIG. 28), it is preferable to place the sensors 100 in the center of each such portion as if only one sensor 100 is placed in one reservoir 300 of a mostly constant geometry.

Figure 30:
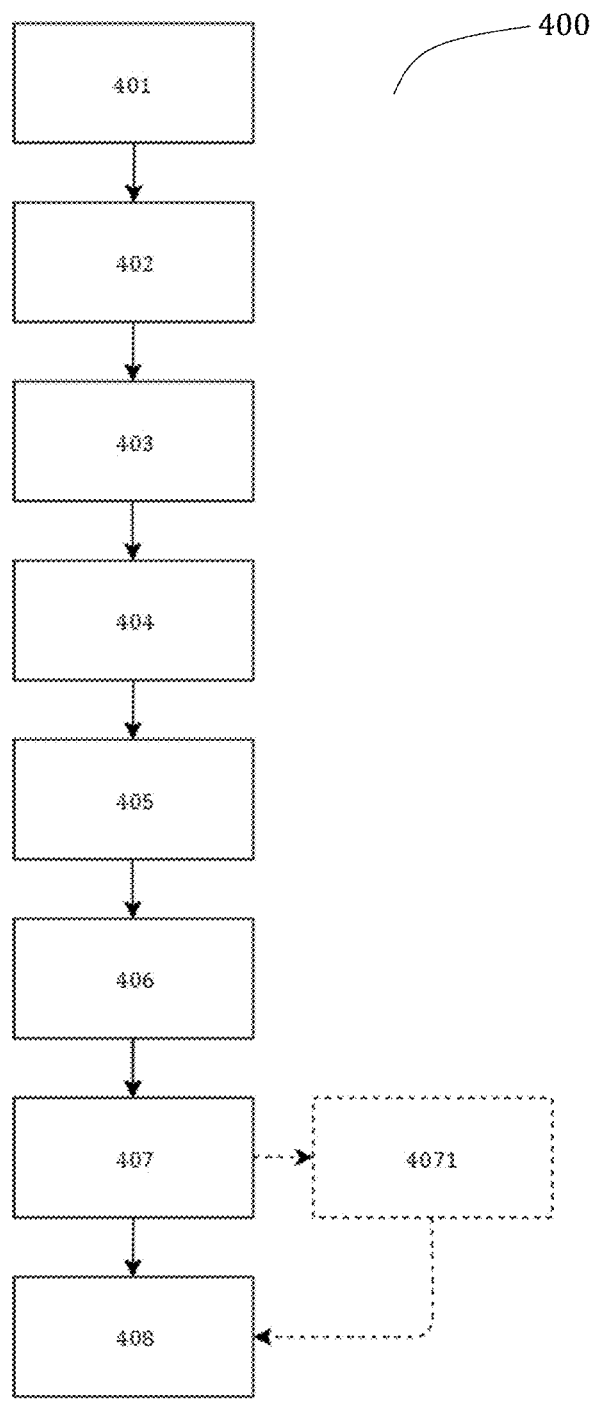
FIG. 30 shows an exemplary diagram for implementing the method for assembling the components of the claimed capacitive level sensor.

As shown in FIG. 30, it is preferable to assemble the sensor 100 by a method 400 for assembling as follows. At step 401, the expansion sleeves 1040 connected to the metal rods 1050 are connected to the base 1010 by means of said threaded holes. Then, at step 402, the computing unit 1060 is installed in the recess 1013. Then, at step 403, the output cable 1063 is soldered to the computing unit 1060. After that, at step 404, the cover 1014 is installed to protect the recess 1013, this is followed by sealing with a compound through the threaded hole 1015. After that, at step 405, the output cable 1063 is screwed into the threaded hole 1015. Once the compound has cured enough, at step 406, pre-calibration is carried out, and the pre-calibration consists of normalizing the values obtained from the compensation measuring channels, which are one or more channels formed by one or more of the metal rods 1050 at this step, by the value obtained from the main measuring channel, which is the only channel formed by only one metal rod 1050 at this step, calculating correction factors and recording them into the non-volatile memory of the computing unit 1060. Then, at step 407, the electrodes 1031 and 1032 are screwed onto the metal rods 1050, thereby providing their primary connection to the computing unit 1060. Now, at step 4071, the electrodes 1031, 1032 may optionally be insulated. After that, at step 408, the housing 1020 is installed by stringing it on the electrodes 1031, 1032 and rigidly fixed in the collar part 1012 of the base 1010 by means of, for example, not limited to pop rivets, while the electrodes 1031, 1032 are rigidly fixed inside the tubes of the housing 1020 by means of spacer rings 1033.

Figure 31:
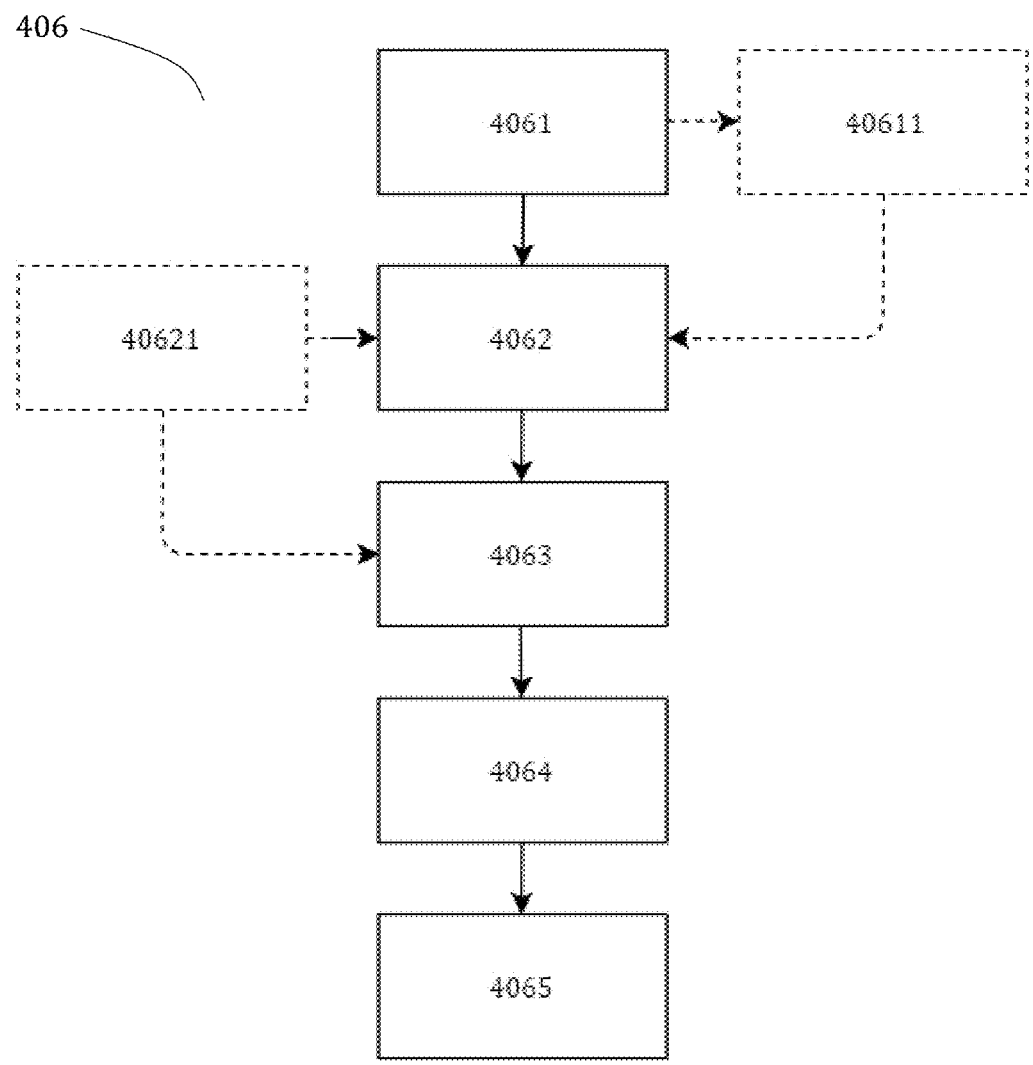
FIG. 31 shows an exemplary diagram for implementing the method for pre-calibrating the claimed capacitive level sensor.

As shown in FIG. 31, it is preferable to pre-calibrate the sensor 100 at step 406 as follows.

At step 4061, the capacitance of the main measuring channel is measured.

At optional step 40611, to obtain the normalized capacitance value of the main measuring channel, the measured capacitance value of the main measuring channel is normalized by the capacitance value at the reference temperature by means of the microcontroller of the computing unit 1060 by using the temperature compensation factor, the value of which has previously been recorded into the non-volatile memory of the computing unit 1060.

At step 4062, the capacitance of each compensation measuring channel is measured.

At optional step 40621, to obtain the normalized capacitance value of the compensation measuring channel, the measured capacitance value of each compensation measuring channel is normalized by the capacitance value at the reference temperature by means of the microcontroller of the computing unit 1060 by using the temperature compensation factor, the value of which has previously been recorded into the non-volatile memory of the computing unit 1060.

At step 4063, to obtain values of primary correction factors, the differences between each (normalized) capacitance value of the compensation measuring channel and the (normalized) capacitance value of the main measuring channel are calculated by means of the microcontroller of the computing unit 1060.

At step 4064, to obtain a set of primary correction factors, the operations of steps 4061 to 4063 are iteratively repeated for a certain period, which preferably does not exceed 30 minutes.

At step 4065, to obtain the value of the average correction factor, this value is calculated based on the primary values of the correction factors from the set of primary values of the correction factors by means of the microcontroller of the computing unit 1060, and the resulting averaged value of the correction factor is recorded into the non-volatile memory of the computing unit 1060 of the sensor 100.

Figure 32:
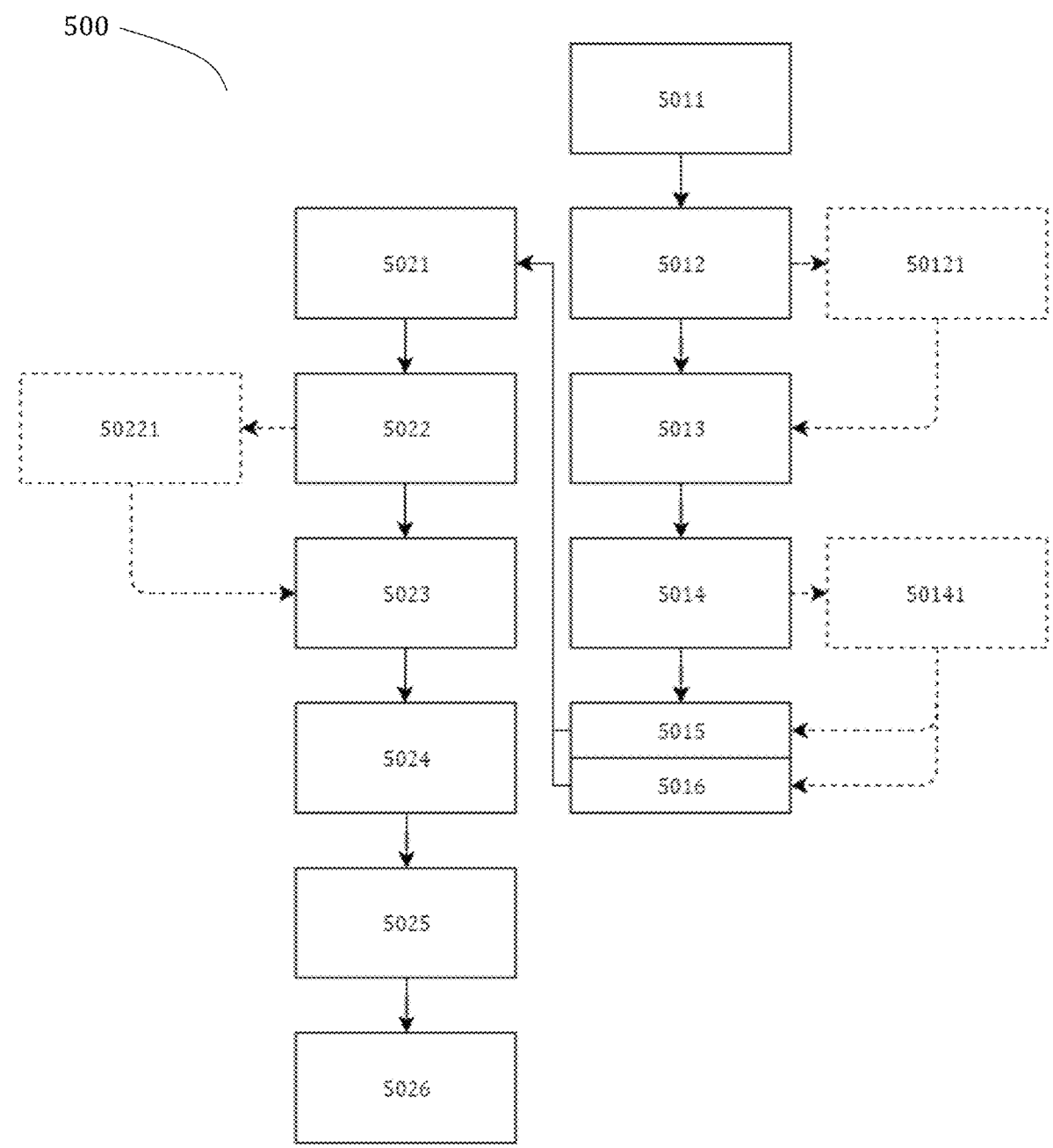
FIG. 32 shows an exemplary diagram for implementing the method for level measuring by means of the claimed capacitive level sensor.

As shown in FIG. 32, it is preferable to measure the level by a method 500 for level measuring as follows.

At step 501, the sensor 100 is calibrated as follows.

At step 5011, the sensor 100 is installed in a reservoir that does not contain any measured medium.

At step 5012, the capacitance values of the main measuring channel and each compensation measuring channel of the sensor 100 are measured for the reservoir that does not contain any measured medium, therewith each measurement of the capacitance value of each compensation measuring channel is carried out taking into account the average correction factor, the value of which is stored in the non-volatile memory of the computing unit 1060.

At optional step 50121, to obtain normalized capacitance values of the measuring channels for the reservoir that does not contain any measured medium, the capacitance values of the measuring channels measured at step 5012 are normalized by the capacitance values of the measuring channels at the reference temperature by means of the microcontroller of the computing unit 1060 by using the temperature compensation factor, the value of which has previously been recorded into the non-volatile memory of the computing unit 1060.

At step 5013, the reservoir is filled with a measured reference medium to the maximum permissible level for this reservoir.

At step 5014, the capacitance values of the main measuring channel and each compensation measuring channel of the sensor 100 are measured for the reservoir that contains the measured reference medium, therewith each measurement of the capacitance value of each compensation measuring channel is carried out taking into account the average correction factor, the value of which is stored in the non-volatile memory of the computing unit 1060.

At optional step 50141, to obtain normalized capacitance values of the measuring channels for the reservoir that contains the measured reference medium, the capacitance values of the measuring channels measured at step 5014 are normalized by the capacitance values of the measuring channels at the reference temperature by means of the microcontroller of the computing unit 1060 by using the temperature compensation factor, the value of which has previously been recorded into the non-volatile memory of the computing unit 1060.

At step 5015, based on the values obtained at steps 5012 and 5014 or based on the normalized values obtained at steps 50121 and 50141, calibration values of the capacitance difference are calculated by means of the microcontroller of the computing unit 1060 by using each capacitance value of the compensation measuring channel obtained at steps 5012 and 5014 and the capacitance value of the main measuring channel obtained at steps 5012 and 5014 pairwise or by using each normalized capacitance value of the compensation measuring channel obtained at steps 50121 and 50141 and the normalized capacitance value of the main measuring channel obtained at steps 50121 and 50141 pairwise, and the resulting calibration values of the capacitance difference are recorded into the non-volatile memory of the computing unit 1060.

At step 5016, which may precede step 5015 or be carried out in parallel to step 5015, based on the values obtained at steps 5012 and 5014 or based on the normalized values obtained at steps 50121 and 50141, a dynamic level range is calculated by means of the microcontroller of the computing unit 1060, with the dynamic level range being the difference between the capacitance value of the main measuring channel for the full reservoir and the capacitance value of the main measuring channel for the empty reservoir, and the resulting values of the dynamic level range are recorded into the non-volatile memory of the computing unit 1060.

At step 502, the level is measured by means of the sensor 100 calibrated at step 501 as follows.

At step 5021, a reservoir is filled with a measured medium to the level at which the longest compensation channel of the sensor 100 is at least partially immersed in the measured medium, while the measured medium differs from the reference medium; or a reservoir is filled with a measured reference medium to any permissible level for this reservoir.

At step 5022, the capacitance values of the main measuring channel and each compensation measuring channel of the sensor 100 are measured for the reservoir that contains the measured medium, therewith each measurement of the capacitance value of each compensation measuring channel is carried out taking into account the average correction factor, the value of which is stored in the non-volatile memory of the computing unit 1060.

At optional step 50221, to obtain normalized capacitance values of the measuring channels for the reservoir that contains the measured medium, the capacitance values of the measuring channels measured at step 5022 are normalized by the capacitance values of the measuring channels at the reference temperature by means of the microcontroller of the computing unit 1060 by using the temperature compensation factor, the value of which has previously been recorded into the non-volatile memory of the computing unit 1060.

At step 5023, to obtain values of the capacitance difference, the values of the capacitance difference are calculated by means of the microcontroller of the computing unit 1060 by using each capacitance value of the compensation measuring channel obtained at step 5022 and the capacitance value of the main measuring channel obtained at step 5022 pairwise or by using each normalized capacitance value of the compensation measuring channel obtained at step 50221 and the normalized capacitance value of the main measuring channel obtained at step 50221 pairwise.

At step 5024, to obtain the value of the correction factor, the values of the capacitance difference obtained at step

5023 are compared to the calibration values of the capacitance difference, and the ratio between these capacitance differences, which is the correction factor, is calculated by means of the microcontroller of the computing unit 1060.

At step 5025, to obtain the capacitance value of the level, each capacitance value of the main measuring channel is normalized by the capacitance value of the level by means of the microcontroller of the computing unit 1060 by using the correction factor, the value of which was obtained at step 5024.

At step 5026, the resulting values of the level are used by means of the microcontroller of the computing unit 1060 in order to determine the relative level according to the values of the dynamic range, which are stored in the memory of the computing unit 1060.

Obtaining the value of the average correction factor at step 4065 makes it possible to measure the level of media with a permittivity different from the permittivity of the measured reference medium. Thus, owing to the use of the average correction factor, the capacitive sensor does not require further calibration when the permittivity of the measured medium changes, for example, in case of changes in the fuel type or characteristics.

This disclosure of the embodiment of the claimed invention demonstrates only alternative embodiments and does not limit other embodiments of the claimed invention, since other possible alternative embodiments of the claimed invention, which do not go beyond the scope of the information set out in this application, should be apparent to those routinely skilled in the art, for whom the claimed invention is designed.

The invention claimed is:

1. A sensitive element for a capacitive level sensor, comprising an electrode housing, the housing comprising a metal section formed by at least two tubes that are connected to each other at least partially along the length of each tube, and further comprising at least one tube-like stiffener distinct from said tubes, the at least one stiffener in contact with at least two adjacent tubes of the metal section, wherein the stiffener extends along the entire length of the housing;

therewith each tube of the section has a slit aligned axially with a corresponding vent hole in a lateral side and arranged at least partially lengthwise at least in one side adjacent to a measured medium;

therewith the electrode housing contains electrodes rigidly fixed in each tube of the metal section, and these electrodes are metal tubes having the same unit-length capacitance but differing in their length, and a main electrode is mostly as long as the electrode housing, and each of one or more compensation electrodes is shorter than the main electrode.

2. The sensitive element of claim 1, wherein the main electrode and each compensation electrode are covered with an insulation wrap.

3. The sensitive element of claim 1, wherein the main electrode and each compensation electrode and the electrode housing are made of the same material.

4. The sensitive element of claim 1, wherein each tube of the section has a slit along its entire length at least in one side adjacent to the measured medium.

5. An electrode housing for a capacitive level sensor, comprising a metal section formed by at least two tubes that are connected to each other at least partially along the length of each tube, and further comprising at least one tube-like stiffener distinct from said tubes, the at least one stiffener in contact with at least two adjacent tubes of the metal section, wherein the stiffener extends along the entire length of the housing;

therewith each tube of the section has a slit aligned axially with a corresponding vent hole in a lateral side and arranged at least partially lengthwise at least in one side adjacent to a measured medium.

6. The housing of claim 5, wherein each tube of the section has a slit along its entire length at least in one side adjacent to the measured medium.

\* \* \* \* \*